US012686264B2

(12) United States Patent
Boaretto et al.

(10) Patent No.: US 12,686,264 B2
(45) Date of Patent: Jul. 21, 2026

(54) COMMERCIAL MOTOR VEHICLE, AUXILIARY AXLE FOR COMMERCIAL MOTOR VEHICLE, DEVICE AND METHOD FOR CONTROLLING THE COUPLING AND/OR UNCOUPLING BETWEEN AN AXLE OF A COMMERCIAL MOTOR VEHICLE AND AN AUXILIARY MOTOR

(71) Applicant: FRAS-LE S.A., Farroupilha (BR)

(72) Inventors: Joel Boaretto, Caxias do Sul (BR); César Augusto Cardoso Teixeira de Albuquerque Ferreira, Caxias do Sul (BR); Carlos Eduardo Michelin Beraldo, Caxias do Sul (BR); Cassiano Henrique Pereira, Caxias do Sul (BR); Eugenio Noro, Caxias do Sul (BR)

(73) Assignee: FRAS-LE S.A., Farroupilha (BR)

( * ) Notice: Subject to any disclaimer, the term of this patent is extended or adjusted under 35 U.S.C. 154(b) by 596 days.

(21) Appl. No.: 18/247,823

(22) PCT Filed: Oct. 5, 2021

(86) PCT No.: PCT/BR2021/050431
§ 371 (c)(1),
(2) Date: Apr. 4, 2023

(87) PCT Pub. No.: WO2022/073092
PCT Pub. Date: Apr. 14, 2022

(65) Prior Publication Data
US 2023/0391188 A1     Dec. 7, 2023

(30) Foreign Application Priority Data

Oct. 5, 2020     (BR) ......................... 102020020462-9

(51) Int. Cl.
*B60K 17/356* (2006.01)
*B60B 35/12* (2006.01)
(Continued)

(52) U.S. Cl.
CPC ............ *B60K 17/356* (2013.01); *B60B 35/12* (2013.01); *B60K 1/00* (2013.01); *B60K 17/02* (2013.01);
(Continued)

(58) Field of Classification Search
CPC ........ B60K 17/356; B60K 1/00; B60K 17/02; B60K 17/165; B60K 17/354;
(Continued)

(56) References Cited

U.S. PATENT DOCUMENTS 7,115,058 B2 * 10/2006 Duncan ................... B60K 6/48
475/5
7,297,083 B2   11/2007 Duncan
(Continued)

FOREIGN PATENT DOCUMENTS

ES        2660552 T3 * 3/2018 ............. B60K 17/36
KR   20140121466 A * 10/2014 ............. B60K 6/383
(Continued)

OTHER PUBLICATIONS

WIPO, International Search Report (in priority application), Feb. 9, 2022.

*Primary Examiner* — Drew J Brown
(74) *Attorney, Agent, or Firm* — Laurence P. Colton; Smith Tempel Blaha LLC

(57)        ABSTRACT
A commercial automotive vehicle, such as trucks and buses, having an auxiliary shaft associated with an auxiliary engine, a coupling and/or uncoupling device and a method for controlling the coupling and/or uncoupling between a shaft of commercial automotive vehicles and an auxiliary
(Continued)

engine associated with the shaft. Specifically, the vehicle has a device that couples and/or decouples the effects of at least one auxiliary engine to a shaft, allowing that, in a coupled state, the shaft receives auxiliary traction from the auxiliary engine or the auxiliary engine acts as a generator of braking energy in a regenerative way and, in a decoupled state, it allows the shaft to rotate freely so that no energy losses occur due to friction of the device components.

11 Claims, 17 Drawing Sheets

(51) Int. Cl.

| | |
|---|---|
| *B60K 1/00* | (2006.01) |
| *B60K 17/02* | (2006.01) |
| *B60K 17/16* | (2006.01) |
| *B60K 17/354* | (2006.01) |
| *B60L 7/10* | (2006.01) |
| *F16D 11/00* | (2006.01) |
| *F16D 11/10* | (2006.01) |
| *F16D 23/02* | (2006.01) |

(52) U.S. Cl.
CPC .......... *B60K 17/165* (2013.01); *B60K 17/354* (2013.01); *B60L 7/10* (2013.01); *F16D 11/10* (2013.01); *F16D 23/02* (2013.01); *B60K 2001/001* (2013.01); *F16D 2011/002* (2013.01); *F16D 2300/14* (2013.01); *F16D 2300/18* (2013.01)

(58) Field of Classification Search
CPC .. B60K 2001/001; B60K 17/35; B60B 35/12; B60L 7/10; B60L 50/90; B60L 2200/28; B60L 2200/40; B60L 7/20; F16D 11/10; F16D 23/02; F16D 2011/002; F16D 2300/14; F16D 2300/18; B60Y 2200/14; B60Y 2400/40; F16H 48/08
See application file for complete search history.

(56) References Cited

U.S. PATENT DOCUMENTS

| | | | | |
|---|---|---|---|---|
| 8,939,862 | B2 * | 1/2015 | Janson | F16H 57/021 |
| | | | | 475/221 |
| 9,649,927 | B2 * | 5/2017 | Piazza | B60K 6/50 |
| 9,944,166 | B2 * | 4/2018 | Janson | B60K 6/48 |
| D821,930 | S * | 7/2018 | Kucharski | D12/160 |
| 10,730,387 | B2 * | 8/2020 | Vollmer | B60K 6/405 |
| 10,882,389 | B2 * | 1/2021 | Kucharski | B60K 17/04 |
| D927,578 | S * | 8/2021 | Baillie | D15/5 |
| 11,247,556 | B2 * | 2/2022 | Kucharski | B60K 1/00 |
| 11,679,656 | B1 * | 6/2023 | Atqiaee | F16H 57/037 |
| | | | | 475/150 |
| 11,679,657 | B1 * | 6/2023 | Atqiaee | B60K 17/165 |
| | | | | 475/150 |
| 11,981,192 | B2 * | 5/2024 | Zhang | F16H 48/08 |
| 12,103,373 | B2 * | 10/2024 | Mepham | B60K 17/08 |
| 2002/0065163 | A1 | 5/2002 | Deichl et al. | |
| 2014/0129105 | A1 * | 5/2014 | Shigeta | B60K 17/35 |
| | | | | 701/69 |
| 2014/0274529 | A1 * | 9/2014 | Edler | F16H 57/031 |
| | | | | 475/150 |
| 2016/0031309 | A1 | 2/2016 | Piazza et al. | |
| 2018/0244150 | A1 * | 8/2018 | Long | F15B 11/08 |
| 2019/0047542 | A1 | 2/2019 | Siuchta | |
| 2019/0054816 | A1 | 2/2019 | Garcia et al. | |
| 2019/0054818 | A1 * | 2/2019 | Garcia | B60K 17/16 |

FOREIGN PATENT DOCUMENTS

| | | | | | |
|---|---|---|---|---|---|
| WO | | 2018045027 | A1 | 3/2018 | |
| WO | WO-2019082257 | A1 * | 5/2019 | | B60K 17/344 |
| WO | WO-2022073091 | A1 * | 4/2022 | | B60B 35/124 |

* cited by examiner

FIG. 1.a

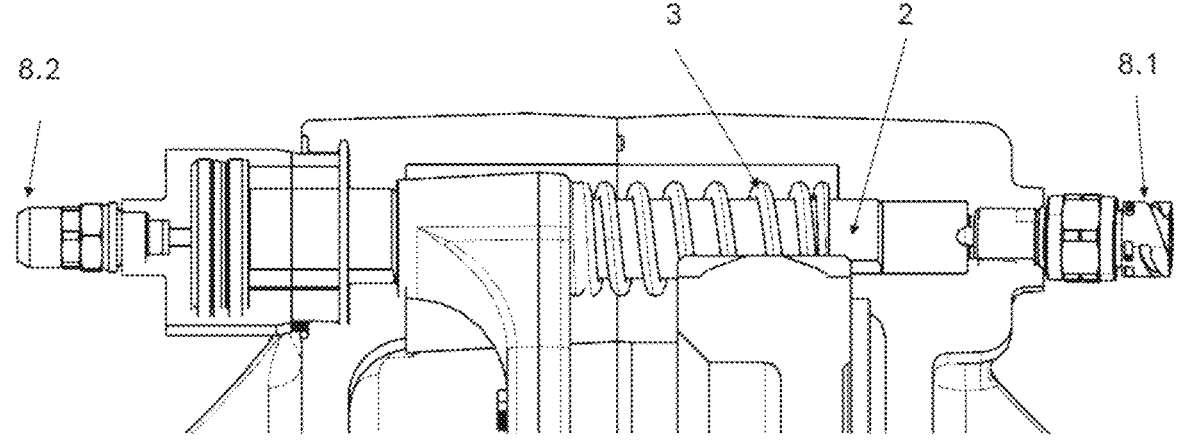
FIG. 1.b
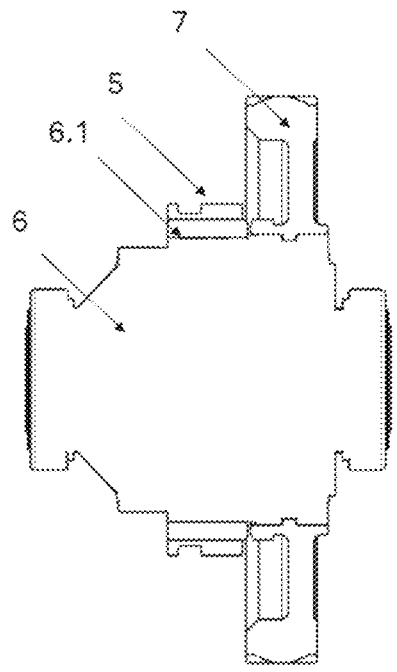
FIG. 2

COMMERCIAL MOTOR VEHICLE, AUXILIARY AXLE FOR COMMERCIAL MOTOR VEHICLE, DEVICE AND METHOD FOR CONTROLLING THE COUPLING AND/OR UNCOUPLING BETWEEN AN AXLE OF A COMMERCIAL MOTOR VEHICLE AND AN AUXILIARY MOTOR

CROSS REFERENCE TO RELATED APPLICATIONS

This application is the US National Phase of and claims the benefit of and priority on International Application No. PCT/BR2021/050431 having a filing date of 5 Oct. 2021, which claims priority on and the benefit of Brazilian Patent Application No. 10 2020 020462-9 having a filing date of 5 Oct. 2020.

BACKGROUND OF THE INVENTION

Technical Field

The present invention describes a commercial automotive vehicle, such as trucks and buses, comprising an auxiliary shaft associated with an auxiliary engine, a coupling and/or uncoupling device and a method for controlling the coupling and/or uncoupling between a shaft of commercial automotive vehicles and an auxiliary engine associated with the shaft. Said device couples and/or decouples the effects of at least one auxiliary engine to a shaft, allowing that, in a coupled state, the shaft receives auxiliary traction from the auxiliary engine or the engine acts as a generator of braking energy in a regenerative way and, in a decoupled state, it allows the shaft to rotate freely so that no energy losses occur due to friction of the device components. The present invention it is in the fields of mechanical engineering, focused on the solution area for transporting cargo and passenger commercial vehicles.

Prior Art

In the context of, for example, off-road with commonly known 4×4 traction vehicles, there are coupling and/or uncoupling mechanisms, wherein their function is to engage or disengage the traction system of one of the vehicle's shafts, interrupting or activating the supply of supplementary auxiliary traction, according to the driver's activation or activated automatically due to two reasons: the first, wherein the supplementary auxiliary traction is provided to overcome vehicle path conditions requiring greater torque; and the second, wherein the supplementary auxiliary traction supply is turned off to avoid dragging the system and the consequent increase in fuel consumption and/or premature wear of system components. In this way, the aforementioned coupling and/or uncoupling mechanism, such as the one known as free wheel, is only applied to shafts having an auxiliary or complementary traction function to the main traction system.

With the advancement of technologies related to the use of electric motors in vehicles and increasingly efficient and smaller batteries, the so-called electric shafts, which comprise shafts of vehicles with an electric motor coupled to it, are being explored in the prior art. Electric shafts provide several advantages in energy and environmental terms, since they use the torque coming from the electric motor to turn the shaft and provide traction to the shaft and the wheels, the electric motor being powered by an energy accumulator, such as a battery, thus providing electric traction to the vehicle with no emitting polluting gases, as well as the electric shaft are used in braking moments as regenerators, recovering the kinetic energy used, promoting control of the vehicle's movement and also feeding the energy accumulators.

In other applications, shafts with electric motors are being used in commercial vehicles in general, such as buses and trucks, to provide auxiliary traction to a shaft that is commonly passive, that is, only traction. In this way, the possibility of loading the auxiliary traction shaft in commercial automotive vehicles and coupling it in times of demand for auxiliary traction provides the supply of auxiliary torque to the commercial automotive vehicle during transposition where the demand for traction is high, for example, on uphill passages. When going downhill, the electric motor can be used as a generator, taking advantage of the energy generated by the movement of the vehicle to charge energy accumulators, such as electric batteries. Still, in these situations it is necessary the auxiliary traction shaft is coupled so that its traction and regeneration functions are met. Thus, with auxiliary traction, the demand for fossil fuel decreases, as well as the generation of polluting gases.

However, at times when the electrified assembly of the auxiliary shaft is not being demanded, as in situations of flat sections, the engagement of the mechanical components of the electric shaft can negatively affect the performance of the commercial automotive vehicle. In these cases, the coupling of the gears from electrified set generates a restriction to the turning movement of the wheelsets, in view of the friction of the gearing systems contained in the auxiliary traction-regeneration shaft, resulting in a condition of greater drag when compared to the original shaft which has no restrictions on movement, which consequently implies an increase in fuel consumption when compared to a standard commercial vehicle on the market.

It is also known to use a differential for traction coupling or uncoupling of a cardan shaft, which can be called a free differential. Patent documents BR 102018074558-1 and BR 102019002876-9 disclose a free differential for road freight transport vehicles of this type. In the present invention, an auxiliary traction source is coupled or uncoupled directly to a shaft of the commercial automotive vehicle with a free differential assembly without cardan shaft.

In countries like Brazil, which has continental dimensions and very varied altimetry planes, this condition of altimetry variation makes it particularly desirable to have an auxiliary traction shaft in moments of ascent and a regenerative shaft in moments of slopes. However, maintaining the coupling of the auxiliary traction shaft in flat sections or with a predominance of flat sections causes friction between the components, which implies in energy loss and/or increased fuel consumption. The present invention solves this problem.

The prior art lacks a solution that has such effectiveness that allows the use of auxiliary traction-regenerative shafts that, even so, can operate safely and efficiently without interfering with the drivability of the vehicle as a whole, and without causing loss of energy or increased vehicle fuel consumption.

From what can be deduced from the researched literature, no documents were found anticipating or suggesting the teachings of the present invention, so that the solution proposed herein has novelty and inventive activity against the prior art.

BRIEF SUMMARY OF THE INVENTION

The present invention solves these and other problems of the prior art from a device and its method of controlling the coupling and/or uncoupling of the effects of an auxiliary regenerative engine, or any source of auxiliary energy, on the auxiliary traction-regenerative shaft, in response to a driver from a signal coming from a control system of the device.

The present invention proposes a solution for coupling and/or decoupling the action of at least one auxiliary engine on at least one shaft of commercial automotive vehicles, making it an auxiliary traction shaft, so that, when activated by a driver or automatically activated by the vehicle in response to conditions of need for auxiliary traction, the device performs the coupling/decoupling action of the auxiliary engine by coupling/decoupling a pair of gears from the auxiliary traction-regenerative shaft.

For the purposes of the present invention, an auxiliary engine is an engine with an auxiliary power source capable of providing auxiliary power to the vehicle, which is a complementary engine to the main engine of the vehicle, but also being able to act as a regenerator, recovering kinetic energy from the vehicle to charge energy accumulators. In commercial automotive vehicles for transporting cargo or passengers, such as trucks and buses, the traction for moving these comes from the shaft associated with the main engine of the commercial automotive vehicle, not being arranged in the passive shafts or with no traction. On the other hand, the auxiliary engine of the present invention can be placed together with at least one shaft of the commercial automotive vehicle that is not associated with the main engine, making a passive shaft into a source auxiliary torque shaft, providing additional torque when required, or acting as an energy regenerator in downhill or braking situations, thus charging the energy accumulators. In one embodiment, the auxiliary motor is an electric motor and the energy accumulators are batteries.

It is also an object of the invention a coupling and/or decoupling mechanism that provides better energy use of the auxiliary shaft, so that, through optimized transmission ratios of the gears, it adds traction to a commonly passive shaft of a commercial automotive vehicle for transport of passengers or cargo.

It is another objective of the invention, a mechanism that couples and/or decouples the effects of an auxiliary engine to the shaft properly, in a safe and efficient way, without interfering in the drivability of the commercial automotive vehicle, so that the coupling/gearing of the effects of the auxiliary engine act as regenerator in situations of slopes; act as a traction helper in situations of slopes; and in situations that do not include these conditions, allow the system to freewheeling, and this safe operating condition is guaranteed by the programming that synchronizes the actuation of the coupling and decoupling system of the gears with the engine rotations, all of which is governed by the system control algorithm of the device of the present invention.

Furthermore, another objective of the invention is a mechanism for coupling and/or decoupling the effects of the auxiliary engine to the shaft of commercial automotive vehicles that operates in synchrony with inputs from sensors that integrate the vehicle as a whole.

In a first object, the present invention have a coupling and/or decoupling device between the shaft of commercial automotive vehicles and at least one auxiliary engine, wherein the auxiliary motor is arranged together with the shaft of the commercial vehicle, said device comprising at least one mechanism that couples and/or decouples the transmission of torque between at least one auxiliary engine supplying auxiliary energy to the vehicle and a shaft free differential assembly, wherein coupling and/or decoupling is in response to at least one signal sent by a control system of the device.

In one embodiment, the coupling and/or decoupling device of the present invention is associated with a powertrain, actuated by a driver and/or automatically in response to conditions of need for auxiliary traction. In one embodiment, the powertrain of the invention comprises an electric motor used as a traction-regenerative source associated with a reducer assembly (9), directly transferring the auxiliary traction to a shaft of the commercial automotive vehicle or receiving regenerative braking energy and transferring that energy to a set of batteries. In one embodiment, the powertrain of the invention is responsive to an electrical signal from a programmable electronic control unit of the control system of the device. In one embodiment, the powertrain of the invention provides the coupling of said auxiliary traction with the vehicle in motion, by synchronizing the speed of the auxiliary traction source with the speed of the shaft operating in free rotation, which synchronization is assisted by a vehicle sensor system.

In a second object, the present invention shows a method of controlling the coupling and/or decoupling between a shaft of commercial automotive vehicles and at least one auxiliary engine arranged adjacent with the shaft, said method comprising a coupling and/or decoupling device between shaft and auxiliary engine equipped with a free differential assembly and a control system of the device, wherein said method comprises the steps of:

a. sending a first signal from the control system to an actuator (1) of the device, activating at least one free differential assembly when the auxiliary motor rotation is synchronized with the shaft rotation, during a coupling period (A) initiated by an auxiliary engine drive vehicle command;

b. displacement of a displacement shaft (2) of the device by the actuator (1) from an initial position, transmitting the movement of said displacement shaft (2) to a sleeve coupling (5) through a motion transmission fork (4), wherein displacement of the sleeve coupling (5) takes place in a coaxial movement with a sprocket wheel (6.1) of the differential (6) of the free differential assembly of the device, engaging the sleeve coupling (5) to a gear (7) which is coupled to the reducer assembly (9) of the auxiliary motor;

c. sending a second signal from the control system to the actuator (1) of the device, returning the displacement shaft (2) to the initial position, during a decoupling period (D) initiated by a new vehicle auxiliary engine deactivation command; and d. returning the displacement shaft (2) to the initial position, transmitting the movement of said displacement shaft (2) to a sleeve coupling (5) through the motion transmission fork (4), wherein the displacement of the sleeve coupling (5) in coaxial movement to a sprocket wheel (6.1) of the differential (6) of the free differential assembly of the device disengages the sleeve coupling (5) of the gear (7), interrupting interaction between the auxiliary engine and the shaft, ending the decoupling period (D).

In a third object, the present invention shows a commercial automotive vehicle comprising at least one shaft associated with at least one auxiliary engine equipped with a reducer assembly (9) associated with a differential, the differential associated with the shaft being a free differential assembly and being associated with at least one torque transmission coupling and/or decoupling device between said auxiliary engine and the shaft, wherein the coupling and/or decoupling is in response to at least one signal sent by a control system of the device.

In a fourth object, the present invention shows an auxiliary shaft for a commercial automotive vehicle powered by regenerative energy comprising at least one auxiliary engine equipped with a reducer assembly (9) which is associated with the auxiliary shaft through at least one free differential assembly, said differential being associated with at least one torque transmission coupling and/or decoupling device between said auxiliary engine and the shaft, in response to at least one signal sent by a control system of the device.

Additionally, the present invention, in an embodiment of the concept herein elaborated, provides that the coupling of the engine effects of the auxiliary energy source occurs with the vehicle in motion, performing the synchronization of the speed of the auxiliary shaft mechanism with the speed of the shaft operating freely. Given the synchronism, which can be detected by a sensor system, the mechanism performs said coupling.

These and other objects of the invention will be immediately appreciated by those skilled in the art and will be described in detail below.

BRIEF DESCRIPTION OF THE DRAWINGS

The following figures are shown:

FIG. 1.*b* shows a detailed view of the FIG. 1.*a* with an embodiment comprising two sensors, a coupling sensor (8.1) and a decoupling sensor (8.2).

FIG. 2 shows another cross-sectional view of an embodiment of the present invention, illustrating the gear (7) associated with the differential (6) by bearings.

DETAILED DESCRIPTION OF PREFERRED EMBODIMENTS

Figure 1:
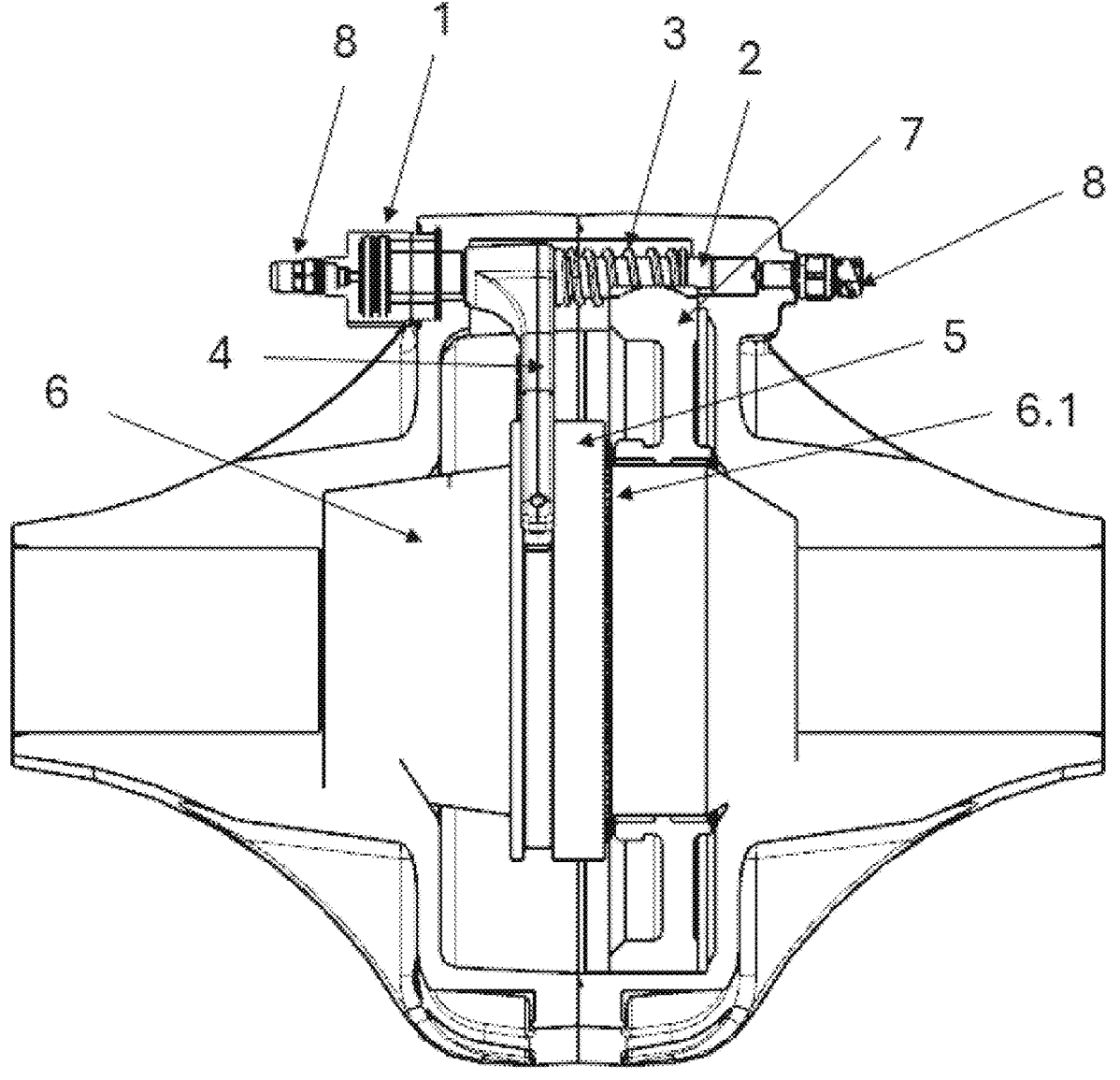
FIG. 1.*a* shows a cross-sectional view of an embodiment of the device of the present invention.

The present invention comprises a device commercially known as a "free differential", which enables the action of at least one auxiliary engine coupled to at least one traction-regenerative shaft of commercial automotive vehicles at times of specific demand, as well as allowing the decoupling of the system of gears, allowing decoupled running (free-wheeling) of the internal gears, thus avoiding drag, optimizing performance and ensuring savings in fuel consumption.

In this way, the free differential assembly of the present invention allows coupling the effects of the auxiliary motor through the coupling of a pair of shaft gears in situations of uphill, wherein the electric motor acts as a helper and in situations of slopes or braking, wherein the auxiliary engine acts as a regenerator, and allows for decoupling in traffic situations on flat sections.

In free differential applications for coupling and/or decoupling the actions of the auxiliary engine to the shaft, there is a demand for a robust, safe assembly that acts in response to parameters from sensing, so that it couples the effects of the auxiliary engine to the shaft correctly and safely in times of need for auxiliary traction or in times of energy regeneration, and decouples correctly and safely when the set is not working, so that it does not affect the drivability and functioning of the other components of the commercial automotive vehicle. The present invention proposes a solution for a free differential device for shafts of commercial automotive vehicles equipped with an auxiliary engine.

For the purposes of the present invention, an auxiliary engine is an engine with an auxiliary power source capable of providing auxiliary power to the vehicle, which is a complementary engine to the main engine of the vehicle, but also being able to act as a regenerator, recovering kinetic energy from the vehicle to charge energy accumulators. In commercial automotive vehicles such as trucks and buses, the traction for moving these comes from the vehicle's main engine, which is adjacent to the traction shaft of the vehicle, not being placed in the naturally passive shafts, that is, only traction. On the other hand, the auxiliary engine of the present invention can be placed adjacent to at least one shaft of the commercial automotive vehicle that is different from the main tractor shaft, providing complementary torque when required, or acting as an energy regenerator in situations of slope or braking, thus charging the energy accumulators. In one embodiment, the auxiliary motor is an electric motor and the energy accumulators are batteries. In one embodiment, the torque provided by the auxiliary engine is always less than or equal to the torque provided by the main engine, never exceeding it.

In a first object, the present invention shows a coupling and/or decoupling device between the shaft of commercial automotive vehicles and at least one auxiliary engine, wherein the auxiliary engine is arranged adjacent to the shaft of the commercial automotive vehicle, said device comprises at least one mechanism that couples and/or decouples the transmission of torque between at least one auxiliary engine and a free shaft differential assembly, wherein coupling and/or decoupling is in response to at least one signal sent by a control system of the device.

In one embodiment, the auxiliary engine of the present invention is an electric motor associated with energy accumulators. In one embodiment, the energy accumulators are batteries. In one embodiment, the auxiliary engine receives power from the batteries to provide torque to the shaft. In another embodiment, the auxiliary engine acts as a generator, receiving kinetic energy from the shaft to charge the batteries.

In one embodiment, the free differential assembly comprises a differential (6) provided with at least one sprocket wheel (6.1); and at least one gear (7) connected with independent rotation to the differential (6) by means of at least one set of bearings, wherein the gear (7) is coupled to at least one reducer assembly (9) of the auxiliary engine. By means of the bearing connection between the gear (7) and the differential (6), said gear (7) is able to rotate under the effect of the reducer assembly (9) of the auxiliary motor independently of the rotation of the differential (6) and therefore the shaft.

In one embodiment, the mechanism that couples and/or decouples the torque transmission comprises at least one actuator (1), at least one displacement shaft (2), at least one motion transmission fork and at least one sleeve coupling (5). The actuator (1) is connected to at least one displacement shaft (2), so that the actuator (1) is able to move the displacement shaft (2) along its length. The motion transmission fork (4) is connected to the displacement shaft (2), so that when the actuator (1) moves the displacement shaft (2), the motion transmission fork (4) is also displaced. The sleeve coupling (5) is associated with the movement transmission fork (4) and the sleeve coupling (5) is coupled to the sprocket wheel (6.1) of the free differential assembly. The sleeve coupling (5) is associated with the movement transmission fork (4) by means of sliding pads, so that the coupling cover (5) comprises rotational movement with respect to the movement transmission fork (4). In this way, the sleeve coupling (5) is able to rotate together with the sprocket wheel (6.1) while the movement transmission fork (4) remains without turning.

In one embodiment, the displacement shaft (2) comprises at least one return spring (3) coupled to the displacement shaft (2) which assists in moving the motion transmission fork (4) along the displacement shaft (2), aiding the decoupling. In one embodiment, the actuator (1) is a pneumatic cylinder, positioned in order to overcome the force of the return spring (3) to move the displacement shaft (2) towards the coupling, while, on the other hand, for decoupling, it is enough to cease the supply of air pressure to the actuator (1) so that the return spring (3) returns the displacement shaft (2) to the original decoupled position. Thus, in order to promote safety to the device of the present invention, the rest state of the device is the decoupled state, so that in the absence of a command signal to the actuator (1), the return spring (3) maintains the displacement shaft (2) in the system decoupling position, preventing a malfunction of the auxiliary engine from interfering with vehicle movement. Still in one embodiment, in the event of a breakdown of the system, the decoupling of the effects of the electric motor to the shaft is done automatically. Furthermore, in one embodiment, in previously defined situations, the device is configured in the decoupled position and with the shaft free to run, preventing it from being activated (coupled) in unwanted situations that could compromise the vehicle safety.

In one embodiment, the differential (6) is associable to the gear (7) through the sleeve coupling (5), transmitting torque and rotation between the differential (6) and the gear (7) to each other. In this way, when the sleeve coupling (5) is displaced by the motion transmission fork (4), said sleeve coupling (5) can be coupled or decoupled to the gear (7), while remaining coupled to the sprocket wheel (6.1) of the differential (6). Thus, when the sleeve coupling (5) is coupled to the gear (7) torque and rotation are transmitted between the gear (7) and the differential (6). When the sleeve coupling (5) is decoupled from the gear (7), the sleeve coupling (5) rotates together with the differential (6) and the shaft, while the gear (7) remains associated with the differential (6) by bearings, so that the shaft rotates independently from the rotation of the gear (7) and the auxiliary motor, which is coupled to the gear (7) by the reducer assembly (9). Thus, the device of the present invention is able to stop or allow the interaction between the auxiliary engine and the vehicle shaft.

In one embodiment, the device of the present invention comprises a control system, wherein at least one sensor feeds the control system with captured parameters. In one embodiment, the control system monitors and sends a coupling and/or decoupling signal of the auxiliary engine effects by capturing parameters from at least one sensor of the device. In another embodiment, the control system comprises at least one button arranged on the vehicle dashboard that can be controlled by the driver of the vehicle.

In one embodiment, the device of the present invention further comprises at least one state identification sensor (8) associable to at least one end of the displacement shaft (2), wherein said sensor (8) supplies the control system with captured parameters on the state of the position of the displacement shaft (2). For the purpose of the present invention, the state identification sensor (8) is defined by any sensor component capable of identifying at least two states of the displacement shaft (2), coupled or decoupled. Additionally, said state identification sensor (8) is capable of identifying a transition state between coupled/decoupled, making it possible to verify the position of the displacement shaft (2).

In one embodiment, the said state identification sensor (8) comprises a coupling identification sensors (8.1) and a decoupling identification sensor (8.2), one at each stroke end of the displacement shaft (2), the decoupling sensor (8.2) being arranged next to the actuator (1), which identifies when the system is decoupled, while the coupling identification sensor (8.1) is arranged in the device casing in the opposite end of the displacement shaft (2). In this way, when the sleeve coupling (5) is decoupled from the gear (7), the decoupling identification sensor (8.2), which is next to the actuator (1), sends a signal to the control system informing the proximity of the displacement shaft (2) while the coupling identification sensor (8.1), opposite the decoupling sensor (8.2), sends a signal to the control system informing the distance from the displacement shaft (2), or does not send a signal. In the same way, when the sleeve coupling (5) is coupled to the gear (7), the decoupling sensor (8.2), which is next to the actuator (1), sends a signal to the control system informing the distance from the displacement shaft (2), or does not send a signal, while the coupling sensor (8.1), opposite the decoupling sensor (8.2), sends a signal to the control system informing the proximity of the displacement shaft (2).

Although the present invention is capable of operating with a single sensor, using only one state identification sensor (8), the use of two sensors, the coupling sensor (8.1) and the decoupling sensor (8.2) is an embodiment of the present invention, where its redundancy and arrangement at both ends of stroke of the displacement shaft (2) promotes safety and reliability to the operation of the present invention.

In one embodiment, the control system of the device of the present invention communicates with the vehicle main system, it monitors whether the device is coupled or decoupled, but the coupling and/or decoupling command is sent by the vehicle main system, depending on parameters captured by vehicle sensors and/or as a result of a command from the driver.

Figure 25:
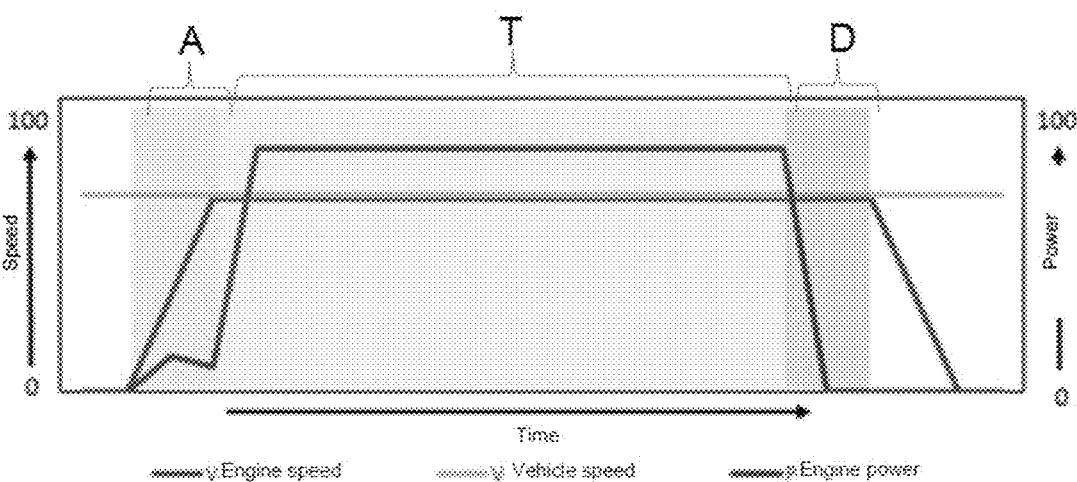
FIG. 25 shows a graph illustrating the operating steps of the present invention, showing the coupling (A), working (T) and decoupling (D) sections.
Figure 26:
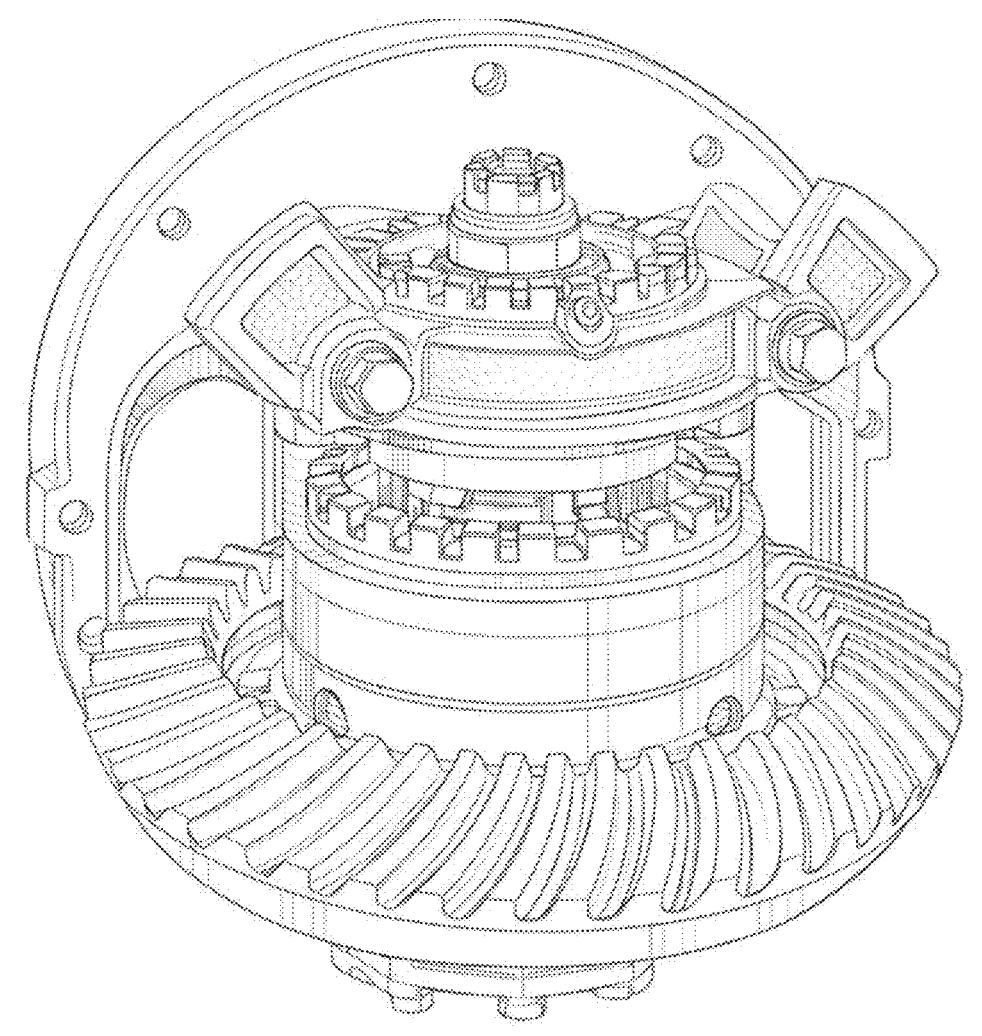
FIGS. 26 to 31 show embodiments of prior-art differentials, wherein the crown gear that is coupled to motors is fixedly connected to the differential.
Figure 27:
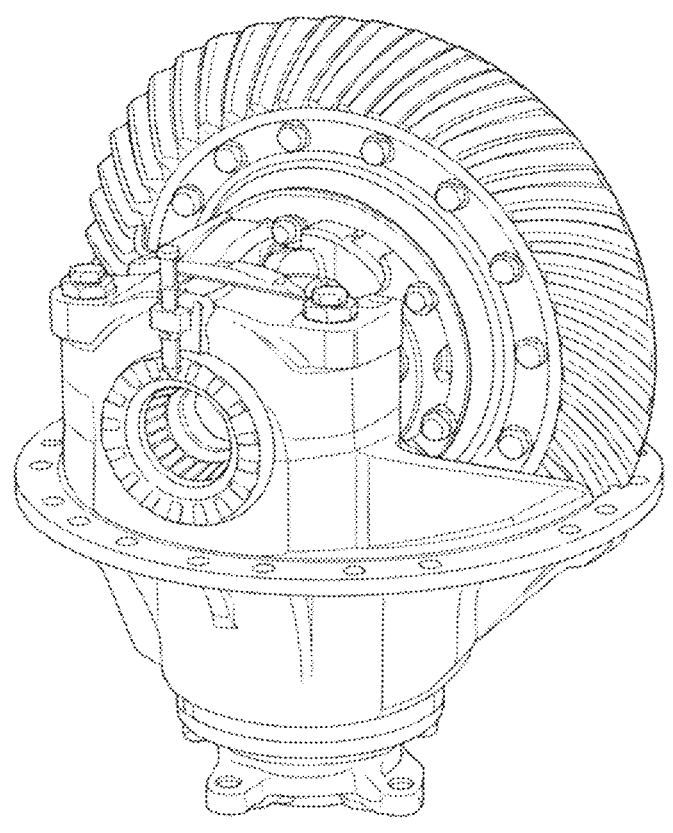
Figure 28:
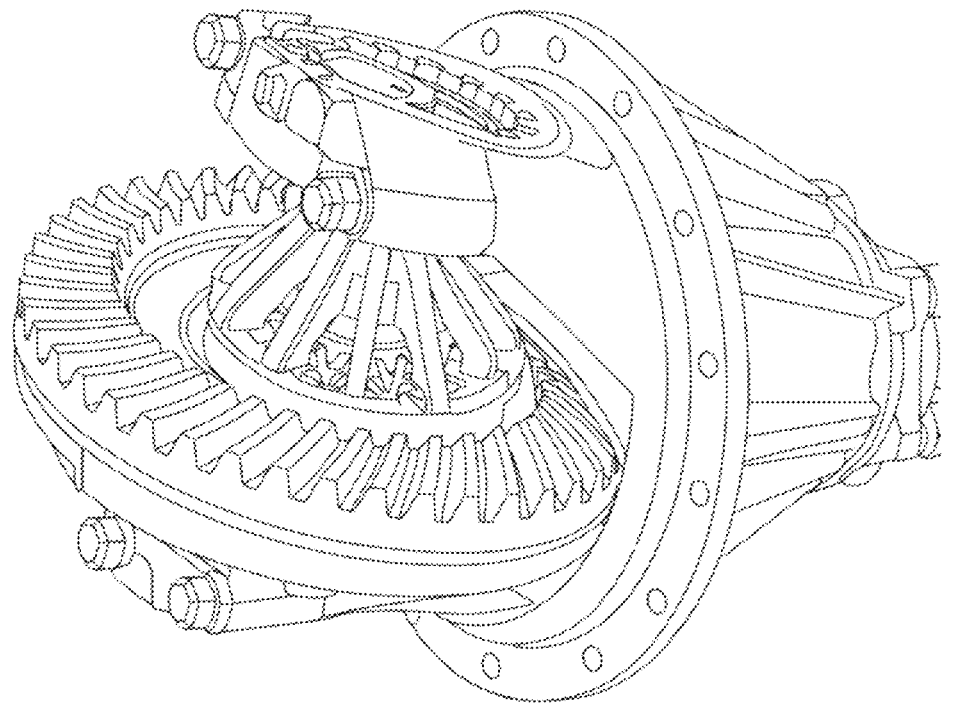
Figure 29:
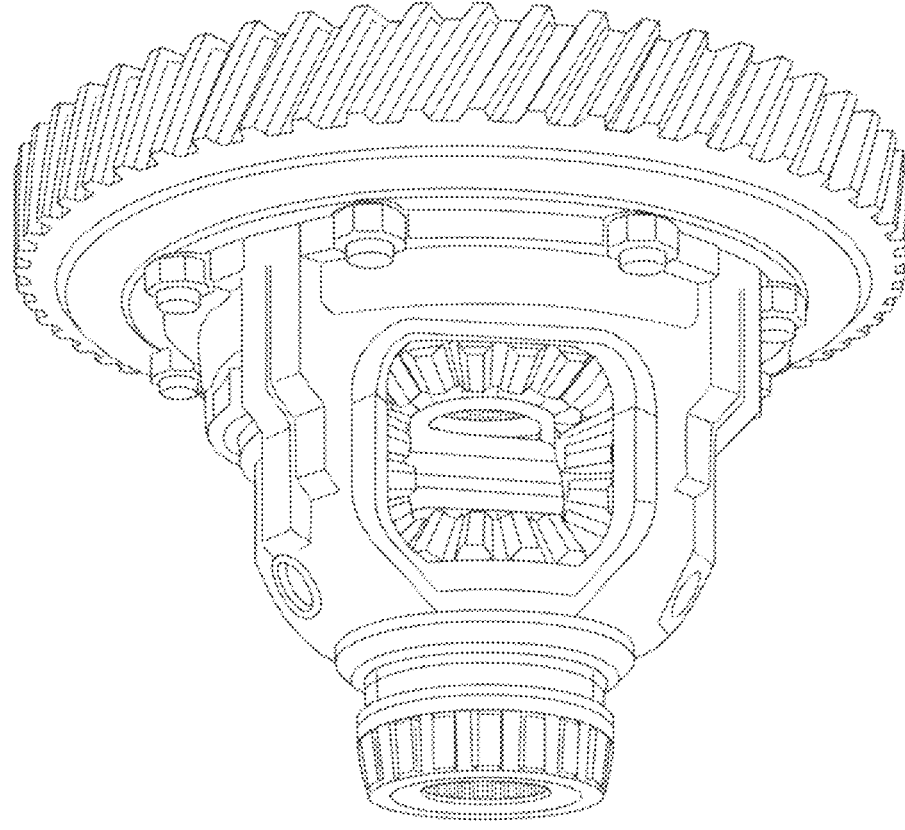
Figure 30:
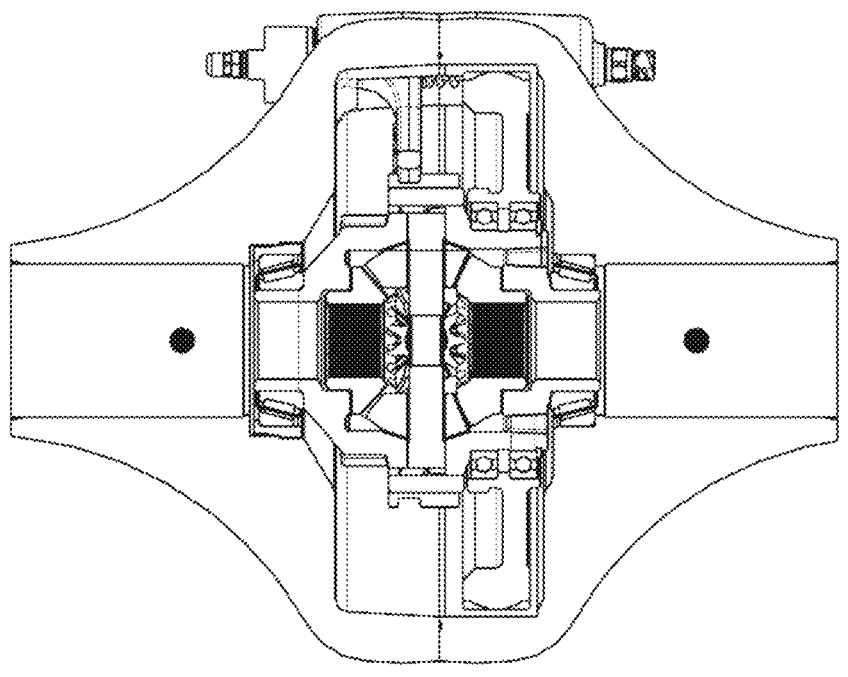
Figure 31:
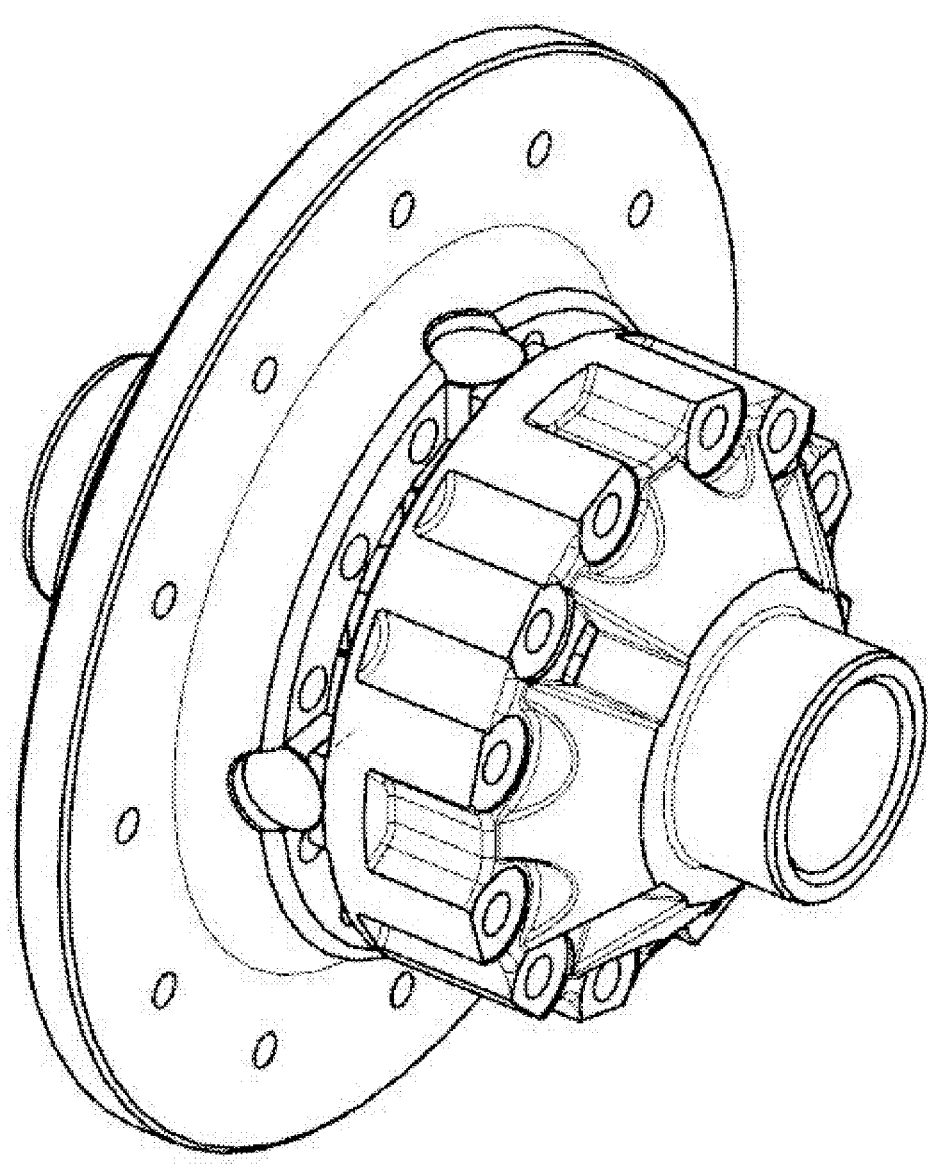

In case of need for coupling, as shown in FIG. 25, the auxiliary engine is started, initiating the coupling period (A), the engine and shaft speeds of the vehicle are monitored. When the engine and the vehicle have synchronized speeds, a signal is sent to the actuator (1) and the coupling is performed, coupling the sleeve coupling (5) to the gear (7), ending the coupling period (A) and starting the working period (T). When the shaft is coupled to the engine, during the working period (T), the engine generates the work power (traction or regeneration), the transfer of torque occurring between the shaft and the engine. When there is no need for coupling, the working period (T) is ended and the decoupling period (D) begins by reducing the torque of the electric motor, relieving the loads between the components, and the decoupling is done by removing the air pressure from the actuator (1) of pneumatic cylinder and the return spring (3) returns the displacement shaft (2) and the motion transmission fork (4) to the initial position, decoupling the sleeve coupling (5) and the gear (7).

In one embodiment, the coupling and/or uncoupling device of the present invention is allocated together with at least one reducer assembly (9) and at least one electric motor associated with the vehicle shaft. In one embodiment, this arrangement of the auxiliary engine device next to the reducer assembly (9) and the vehicle shaft through the gear (7) brings advantages such as reduced maintenance on the system, since the entire free differential set and the sensing system are protected inside a casing, in this way they do not suffer from bad weather. Still in one embodiment, there is the advantage of enabling the control of the rotation of both the differential (6) and the gear (7) through the activation of the electric motor, making a synchronization of rotations between the gears that facilitates the coupling and/or decoupling.

In one embodiment, the auxiliary electrical torque coming from the electric motor and transferred to the shaft of the commercial automotive vehicle via coupling through the shaft coupling and/or decoupling device is an auxiliary torque with respect to the torque coming from the main engine of the commercial automotive vehicle, wherein the auxiliary electrical torque does not overlap with the main engine torque of the commercial automotive vehicle.

In a second object, the present invention shows a method of controlling the coupling and/or decoupling between a shaft of commercial automotive vehicles and at least one auxiliary engine arranged adjacent to the shaft, said method comprising a coupling and/or decoupling device between shaft and auxiliary engine equipped with a free differential assembly and a control system of the device, wherein said method also comprises the steps of:

a. sending a first signal from the control system to an actuator (1) of the device, activating at least one free differential assembly when the auxiliary motor rotation is synchronized with the shaft rotation, during a coupling period (A) initiated by a drive vehicle command of the auxiliary engine;

b. displacement of a displacement shaft (2) of the device by the actuator (1) from an initial position, transmitting the movement of said displacement shaft (2) to a sleeve coupling (5) through a motion transmission fork (4), wherein displacement of the sleeve cover (5) is in a coaxial movement with a sprocket wheel (6.1) of the differential (6) of the free differential assembly of the device, engaging the sleeve coupling (5) to a gear (7) which is coupled to the reducer assembly (9) of the auxiliary motor;

c. sending a second signal from the control system to the actuator (1) of the device, returning the displacement shaft (2) to the initial position, during a decoupling period (D) initiated by a new command from the auxiliary engine deactivation vehicle; and d. return of the displacement shaft (2) to the initial position, transmitting the movement of said displacement shaft (2) to a sleeve coupling (5) through the motion transmission fork (4), wherein the displacement of the sleeve coupling (5) in coaxial movement to a sprocket wheel (6.1) of the differential (6) of the free differential assembly of the device disengages the sleeve coupling (5) of the gear (7), interrupting interaction between the auxiliary motor and the shaft, ending the decoupling period (D).

In one embodiment, the method of the present invention operates with the device of the present invention, said device being as defined above.

In one embodiment, preliminary to the step of sending a first signal from the control system to an actuator (1) of the device, the method of the present invention comprises an initial step of receiving at least one position parameter of a displacement shaft (2) of the device by the control system of the device, due to the receipt of a command from the vehicle, said position parameter sent to the control system by at least one state identification sensor (8) associable to at least one end of the displacement shaft (2).

In one embodiment, two identification sensors (8) are used, the coupling identification sensor (8.1) and the decoupling identification sensor (8.2), one at each stroke end of the displacement shaft (2) in order to promote greater safety and reliability to the method of the present invention, so that, after the displacement start of the displacement shaft (2), it is always checked if it has reached its stroke end through the signals sent by the coupling sensor (8.1) and the decoupling sensor (8.2).

In one embodiment, the control system of the present invention operates together with a control system of the vehicle, so that vehicle parameters, such as speed, amount of fuel and/or battery power available, topography of the terrain, among others, are monitored by the vehicle and the decision on the need for coupling or decoupling is checked by the vehicle system. Subsequently, the signal is sent to the control system of the device of the present invention, which measures the position of the system by the state identification sensors (8) and sends a signal to the actuator (1) to change the position between coupled and decoupled.

In one embodiment, the method of the present invention comprises the following steps that end the coupling period (A) and start the working period (T): the coupling between the gear (7) and the differential (6) given by the sleeve coupling (5); and receiving, by the control system of the device, at least one new position parameter of the displacement shaft (2) sent to the system by the coupling identification sensor (8.1) and/or by the decoupling identification sensor (8.2).

In one embodiment, the method of the present invention comprises the following steps that end the work period (T) and start the decoupling period (D): reducing the power of the auxiliary engine to relieve the load between the coupled components; and sending a signal (or signal interruption) to the actuator (1), initiating the return of the displacement shaft (2) to its initial position due to the effect of the return spring (3).

In one embodiment, the method of the present invention comprises the following steps that end the decoupling period (D): the decoupling between the gear (7) and the differential (6) given by the return of the sleeve coupling (5) to its position original, and receiving, by the control system of the device, at least one new position parameter of the displacement shaft (2) sent to the system by the coupling identification sensor (8.1) and/or by the decoupling identification sensor (8.2). In one embodiment, aiming at greater security given by redundancy and double verification, the system receives data from the coupling identification sensor (8.1) and the decoupling identification sensor (8.2) simultaneously.

In one embodiment, the operation of gearing/coupling the device to the shaft is performed in synchrony with inputs from sensors that are part of the commercial automotive vehicle. In this way, in one embodiment, when the coupling operation is initiated, the coupling and/or decoupling device rotates at the same speed or similar speed to the shaft rotation speed and, when there is synchronization between the rotation speeds, there is the meeting/coupling of the gears, so that the coupling is carried out smoothly and without interference in the movement of the commercial automotive vehicle, so that the performance is not affected.

In one embodiment, the coupling and decoupling operations of the auxiliary engine actions to the shaft are controlled by an algorithm of the control system, so that the algorithm acts to prevent interference in the speed and drivability of the vehicle as a whole.

In one embodiment, the displacement of the displacement shaft (2) transmitting the movement to a coupling cover (5) is carried out by means of an actuator (1) for activating the system that by means of pressure or air decompression, moves the displacement shaft (2). Still in one embodiment, a return spring (3) associated with the displacement shaft (2) assists in moving, compressing or decompressing the return spring (3).

In one embodiment, the motion transmission fork (4) is connected to a sleeve coupling (5) equipped with a grooved internal structure, wherein in situations of coupling the actions of the electric motor to the shaft, said sleeve coupling (5) is coupled to the sprocket wheel (6.1) of the differential (6) and to the gear (7). In one embodiment, in coupling situations, the sleeve coupling (5) moves and couples in the connection interface between the differential (6) and the gear (7), wherein the gear (7) is connected to a motor electric that transfers torque to the gear (7) through a reducer assembly (9). That is, the coupling performed through the sleeve coupling (5) allows the torque to be transferred between the gear (7) and the differential (6), transferring between the auxiliary engine and the shaft.

In one embodiment, decoupling the auxiliary engine effects from the shaft allows the shaft to rotate freely, without interference from other components.

In one embodiment, the auxiliary electrical torque coming from the electric motor and transferred to the shaft of the commercial automotive vehicle via coupling through the shaft coupling and/or decoupling device is an auxiliary torque with respect to the torque coming from the main engine of the commercial automotive vehicle, where the auxiliary electrical torque does not overlap with the main engine torque of the commercial automotive vehicle.

In a third object, the present invention shows a commercial automotive vehicle comprising at least one shaft associated with at least one auxiliary engine equipped with a reducer assembly (9) associated with a differential, the differential being a free differential assembly and being associated with the shaft and being associated with at least one torque transmission coupling and/or decoupling device between said auxiliary engine and the shaft, wherein the coupling and/or decoupling is in response to at least one signal sent by a control system of the device.

In one embodiment, the shaft coupling and/or decoupling device couples and/or decouples the actions of the auxiliary engine by engaging the shaft to the auxiliary engine so that traction or regenerative torque occurs and/or disengaging so that the shaft rotates freely without interference from the auxiliary motor.

In one embodiment, the auxiliary motor is an electric motor capable of operating as a regenerative braking energy generator, as well as being an auxiliary electrical torque supplier, wherein the electrical torque is derived from regenerative braking energy.

In one embodiment, the coupling and/or decoupling device of the present invention is associated with a powertrain, actuated by a driver and/or automatically in response to conditions of need for auxiliary traction. In one embodiment, the powertrain of the invention comprises an electric motor used as a traction-regenerative source, directly transferring auxiliary traction to a rear shaft or receiving regenerative braking energy and transferring such energy to a set of batteries. In one embodiment, the powertrain of the invention is responsive to an electrical signal from a programmable electronic control unit. In one embodiment, the powertrain of the invention provides the coupling of said auxiliary traction with the vehicle in motion, by synchronizing the speed of the auxiliary engine with the speed of the shaft operating in free rotation, synchronization assisted by a sensor system of the vehicle itself.

In a fourth object, the present invention presents an auxiliary shaft for commercial automotive vehicle powered by regenerative energy comprising at least one auxiliary engine equipped with a reducer assembly (9) which is associated with the auxiliary shaft through at least one differential assembly free, said differential being associated with at least one torque transmission coupling and/or decoupling device between said auxiliary engine and the shaft, in response to at least one signal sent by a control system of the device.

In one embodiment, the auxiliary shaft of the present invention is associated with an energy accumulator such as, for exemplifying purposes, a battery. Thus, with the auxiliary engine coupled to the shaft, energy stored in the battery can be transformed into kinetic energy by the auxiliary engine, transferring torque to the shaft through the differential (6). In the same sense, with the auxiliary engine coupled to the shaft, the kinetic energy can be transferred from the shaft to the auxiliary engine, which here acts as a generator, charging the batteries, this being regenerative energy. In situations where there is no demand for auxiliary torque, such as on flat sections or slopes, or in situations where there is no need to charge the batteries, such as on flat sections or when the batteries are fully charged, the motor is disconnected from the shaft, so that the shaft can rotate without interference from the motor, said decoupling being given by the device of the present invention, described above.

In one embodiment, the shaft of the present invention is an auxiliary traction electric shaft for commercial automotive vehicles, comprising a shaft with an electric motor coupled thereto, wherein the electric motor provides torque to rotate the shaft and provide auxiliary traction to the shaft and the wheels, so the delivered torque does not exceed the main engine of the commercial automotive vehicle.

In one embodiment, the auxiliary shaft is provided with a sensor or a set of sensors that captures parameters of the current operation of the commercial automotive vehicle during use or non-use of the shaft, thus providing feedback data that assists or improves the control system, thus enabling better control over the operation of the commercial automotive vehicle. For example, this means of supplying a parameter makes it possible to calculate more accurately the fuel consumption of the vehicle as a whole.

EXAMPLES

The examples shown below are intended only to exemplify one of the many ways to carry out the invention, but without limiting its scope.

Example 1—Free Differential for Auxiliary Electric Shafts of Commercial Automotive Vehicles In this example, a device was developed for coupling and/or decoupling the actions of an electric motor in a commercial automotive vehicle shaft, which comprises a free differential assembly for application in electric shafts of commercial automotive vehicles.

The free differential set of this embodiment of the invention is applicable to commercial automotive vehicles, such as trucks and buses, equipped with electric shafts and was developed to decouple the auxiliary traction coming from the electric motor coupled to the electric shaft at times when there is no demand for auxiliary electric traction. Likewise, when there is a demand for auxiliary traction, the free differential couples to the gears of said shaft in order to provide auxiliary or helper torque from the electric motor of the electric shaft.

The free differential assembly of this embodiment of the invention was placed together with the electric motor assembly of the electric shaft of a commercial automotive vehicle, more specifically allocated together with the reducer assembly (9) and the electric motor of the electric shaft, arranged in the central part of the shaft. This allocation in the central part of the shaft, sealed by a casing, ensures that the device remains protected from external weather along with the reducer assembly (9) and the electric motor, as well as providing better and more accurate sensing through the protection given to the sensors through the reducer assembly casing. In this way, the device's maintenance needs are reduced, since they are protected within the structure that houses the reducer assembly (9) and the electric motor.

Figure 3:
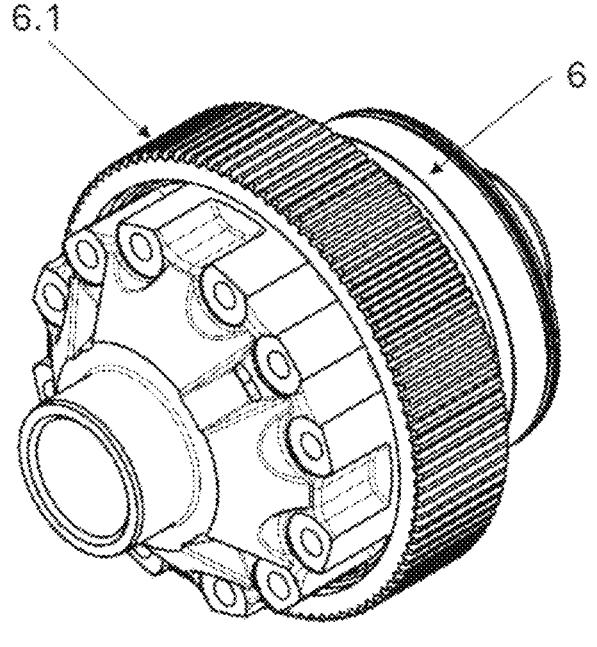
FIG. 3 shows an embodiment of the differential (6) of the present invention.
Figure 4:
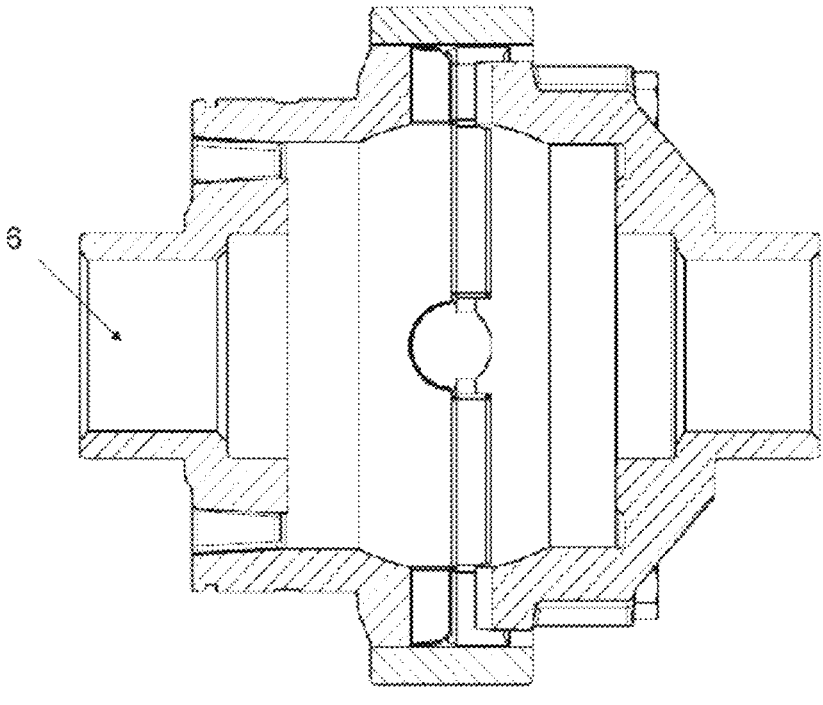
FIG. 4 shows a cross-sectional view of the differential (6) of the present invention.
Figure 5:
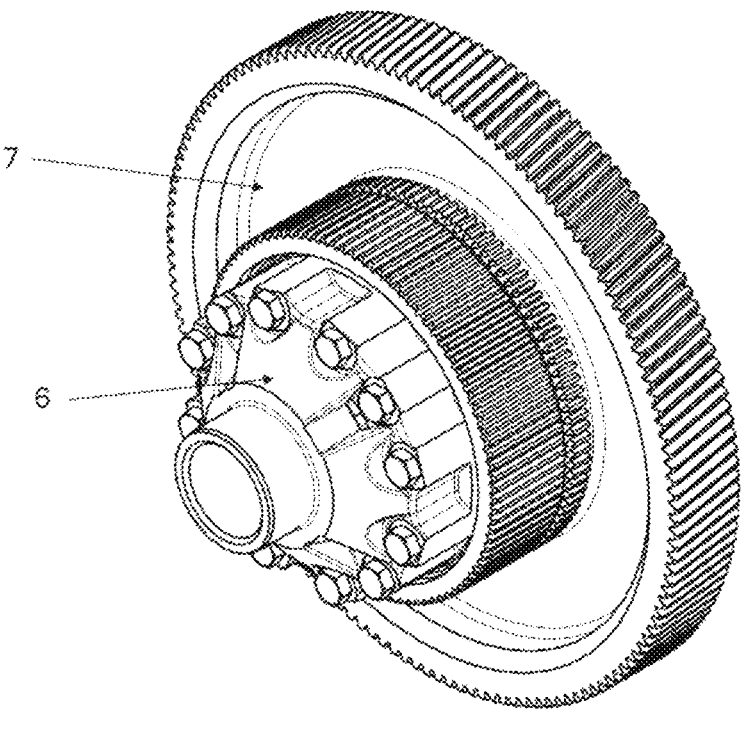
FIG. 5 shows an embodiment of the present invention, illustrating the gear (7) associated with the differential (6) by bearings.
Figure 6:
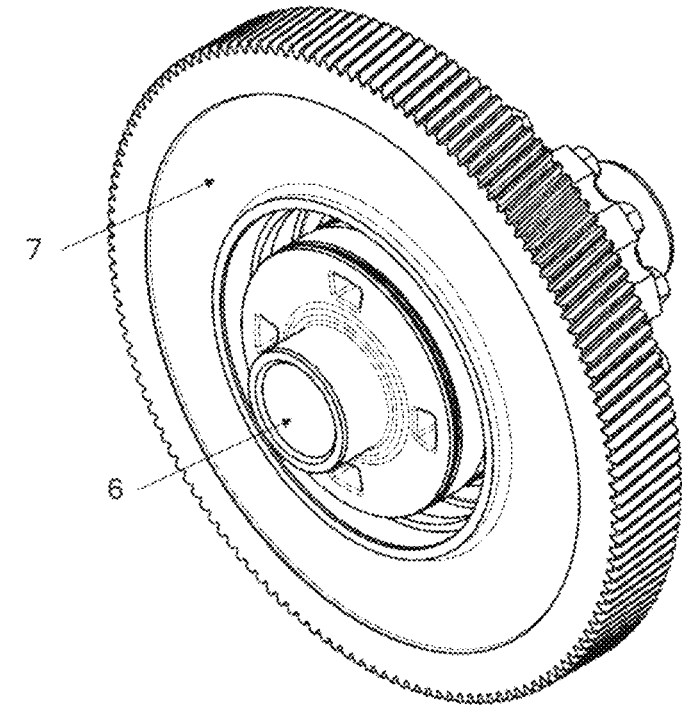
FIG. 6 shows another view of FIG. 5, illustrating an embodiment of the gear (7) and the differential (6).
Figure 7:
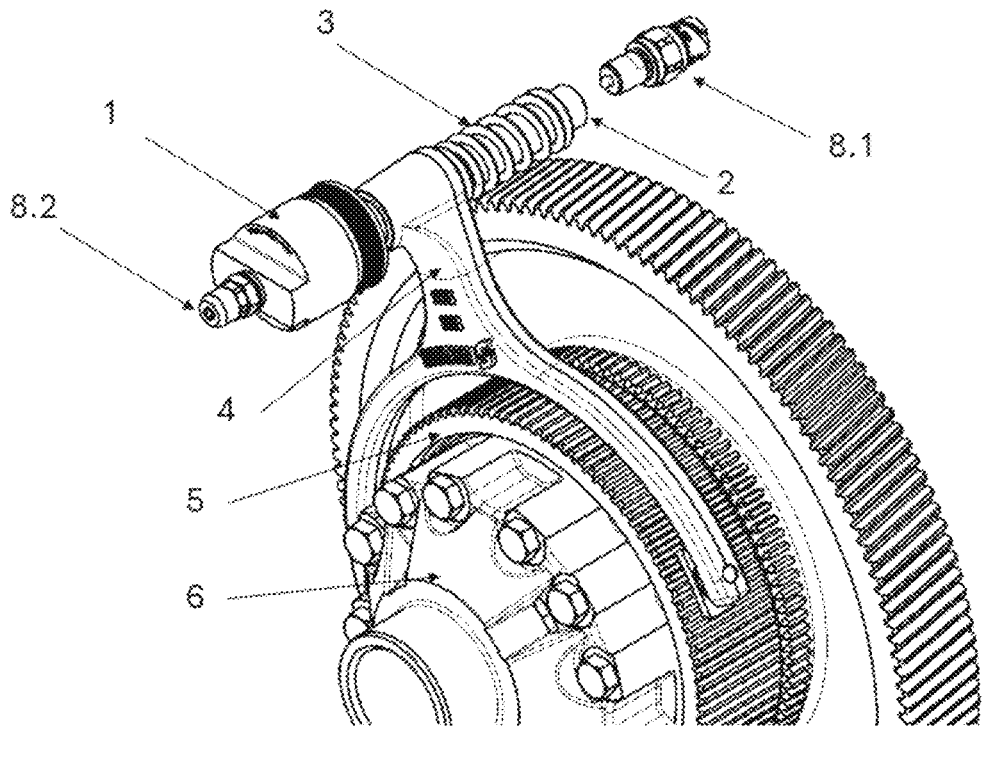
FIG. 7 shows a detailed embodiment of the actuator (1) for activating the system, a decoupling identification sensor (8.2), the displacement shaft (2), the return spring (3), and the motion transmission fork (4) associated with the sleeve coupling (5).

One of the objectives of this embodiment of the present invention is to provide a means to decouple the gear (7) from the differential (6) in a controlled and safe way. A bearing was carried out from said gear (7) to the differential (6) and to the coupling system–motion transmission fork (4)+sleeve coupling (5). This coupling system uses forks (4) in differentials in transmission boxes, which by a signal sent by the control system based on data from a coupling identification sensor (8.1) or a decoupling identification sensor (8.2), in a situation of need, there is a pneumatic pressure in the actuator (1) of the pneumatic cylinder, which moves the fork (4), performing the coupling between the differential (6) and the gear (7) through the sleeve coupling (5), transmitting torque. FIGS. 1 and 2 show cross-sectional views of embodiments of the invention. FIGS. 3 and 4 show embodiments of the differential (6). FIGS. 5 and 6 show embodiments of the differential (6) associated with the gear (7) by bearings, which allows them to rotate freely in relation to each other when the sleeve coupling (5) is not coupled to both simultaneously. FIG. 7 shows an embodiment of the engagement system.

As illustrated by FIG. 25, in coupling period (A) of the free differential set to the shaft, the system of this embodiment operates in synchrony with inputs from sensors that integrate the commercial automotive vehicle, as well as the meeting of the rotations of the electric motor with the shaft gears are synchronized, so that coupling is carried out smoothly and properly, preventing or minimizing interference in the movement of the commercial automotive vehicle and so that performance is not affected, providing greater gains in fuel economy.

This synchronization of rotations is very advantageous for the correct functioning of the system. In this embodiment, an algorithm of the control system works to control the actions of the system in coupling/decoupling so that preventing interference in the speed of the vehicle as a whole so that the commercial automotive vehicle does not "lose gear" and so that the gain in fuel economy is always optimized.

The allocation of the free differential adjacent with the reducer assembly and the electric motor brings the advantages of providing the decoupling of most components so that the components with higher rotation are deactivated, the electronic control of coupling/decoupling in order to control the synchronization of rotations in the coupling.

The free differential assembly of the device of the present invention provides several advantages, such as decoupling the auxiliary traction from the electric shaft in situations that are not favorable to the use of auxiliary traction, such as maneuvers, flat sections, other previously defined situations, etc., increased service life components and reducing lubricating oil temperature.

Figure 8:
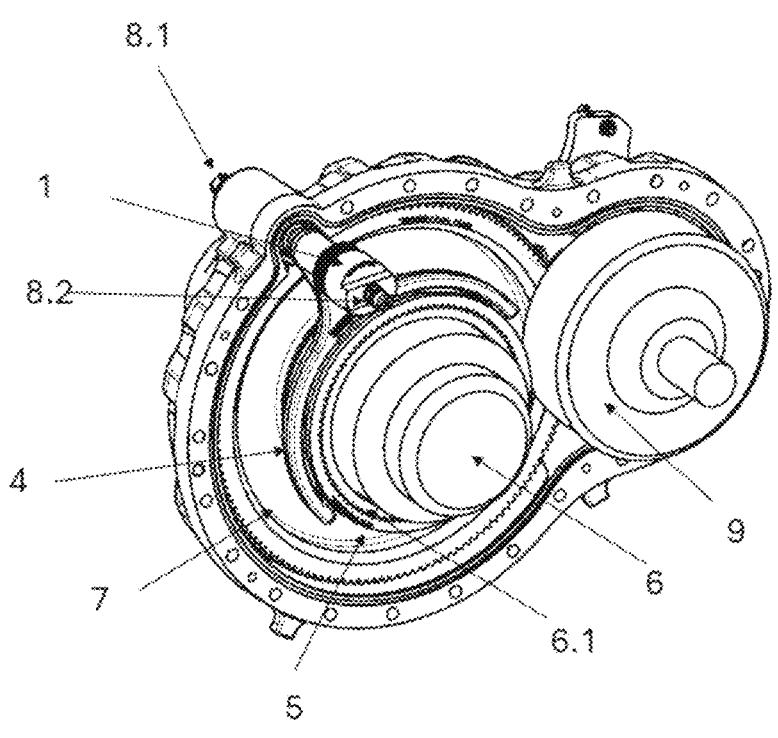
FIG. 8 shows a perspective view of an embodiment of the present invention associated with an open casing.
Figure 9:
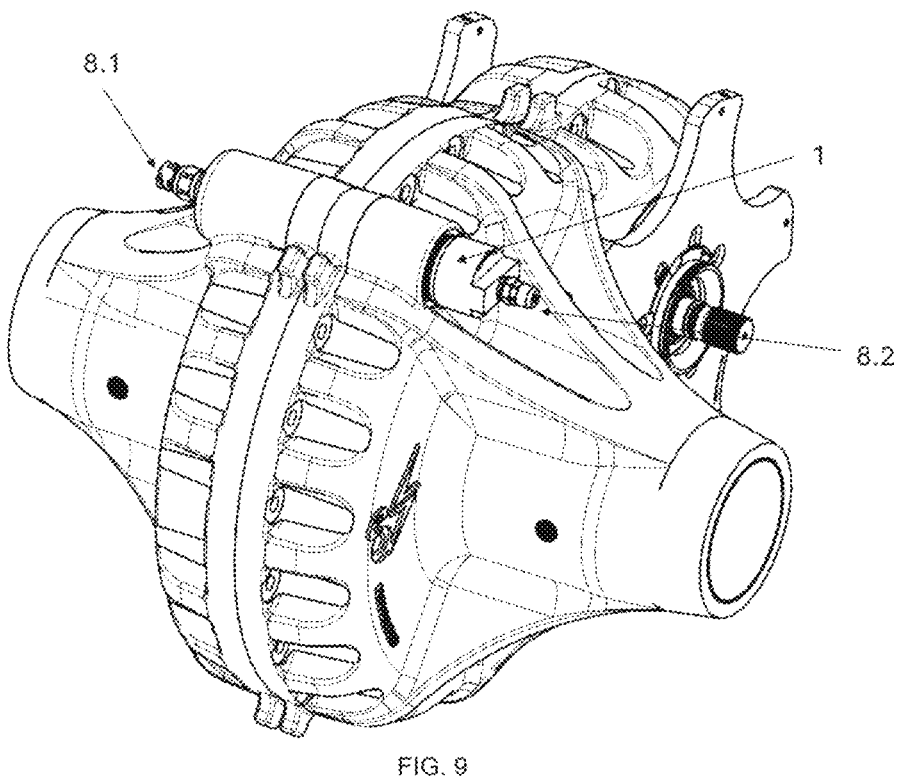
FIG. 9 shows another perspective view of the embodiment of the present invention illustrated in FIG. 8, wherein the casing is closed.
Figure 10:
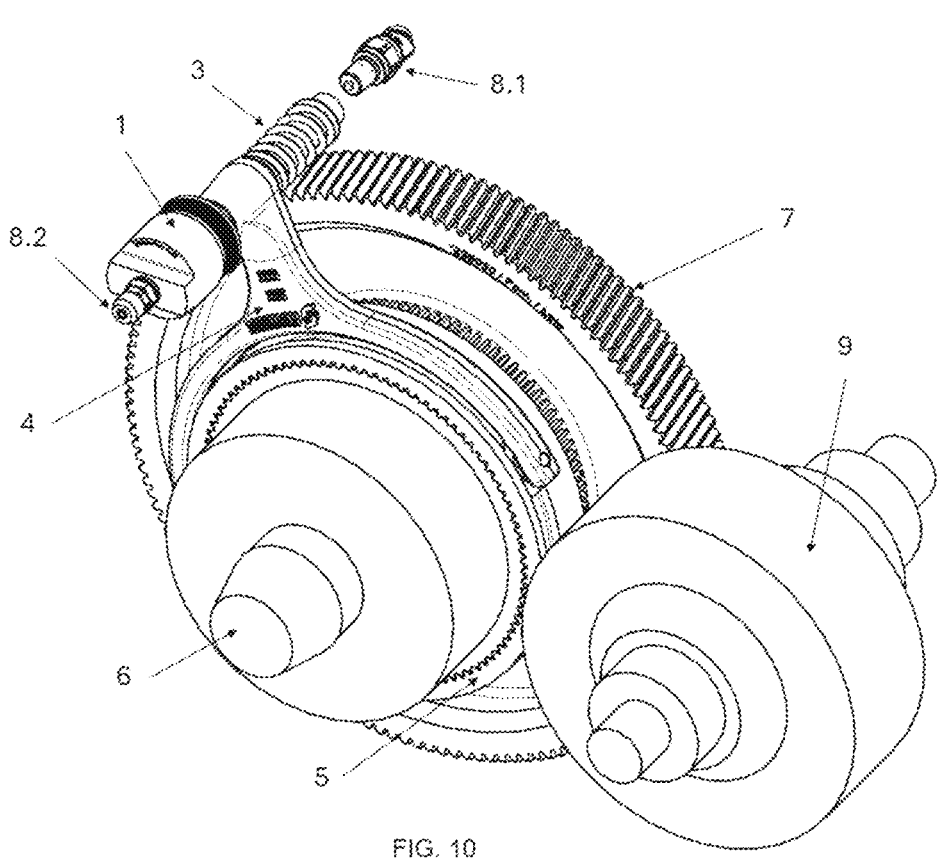
FIG. 10 shows a perspective view of an embodiment of the present invention, shown with no casing.
Figure 11:
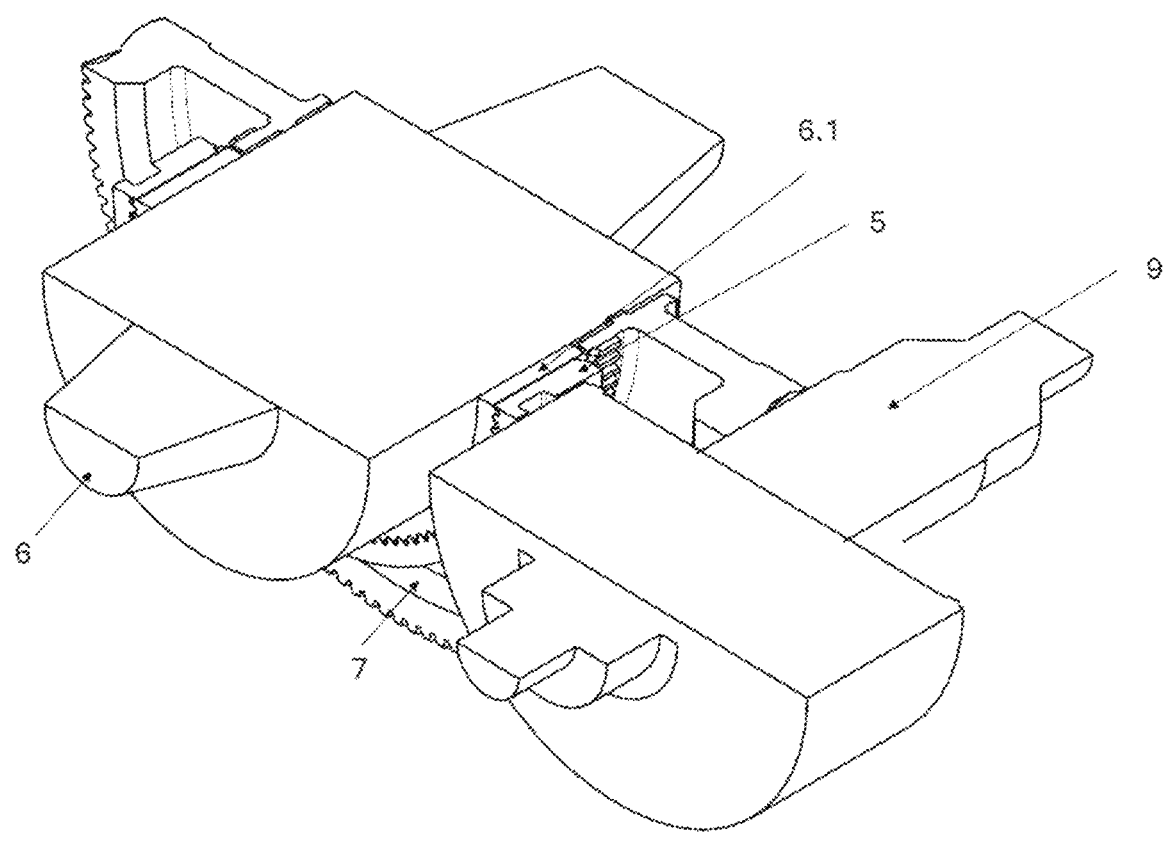
FIG. 11 shows a cross-sectional view of the embodiment shown in FIG. 10.
Figure 12:
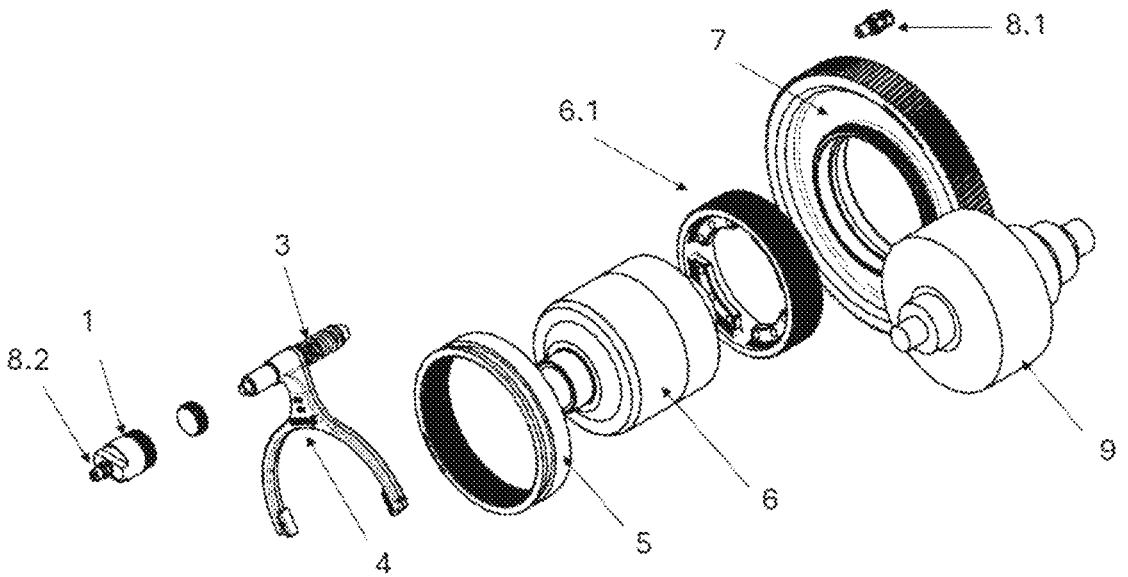
FIG. 12 shows an exploded view of the embodiment shown in FIG. 10.
Figure 13:
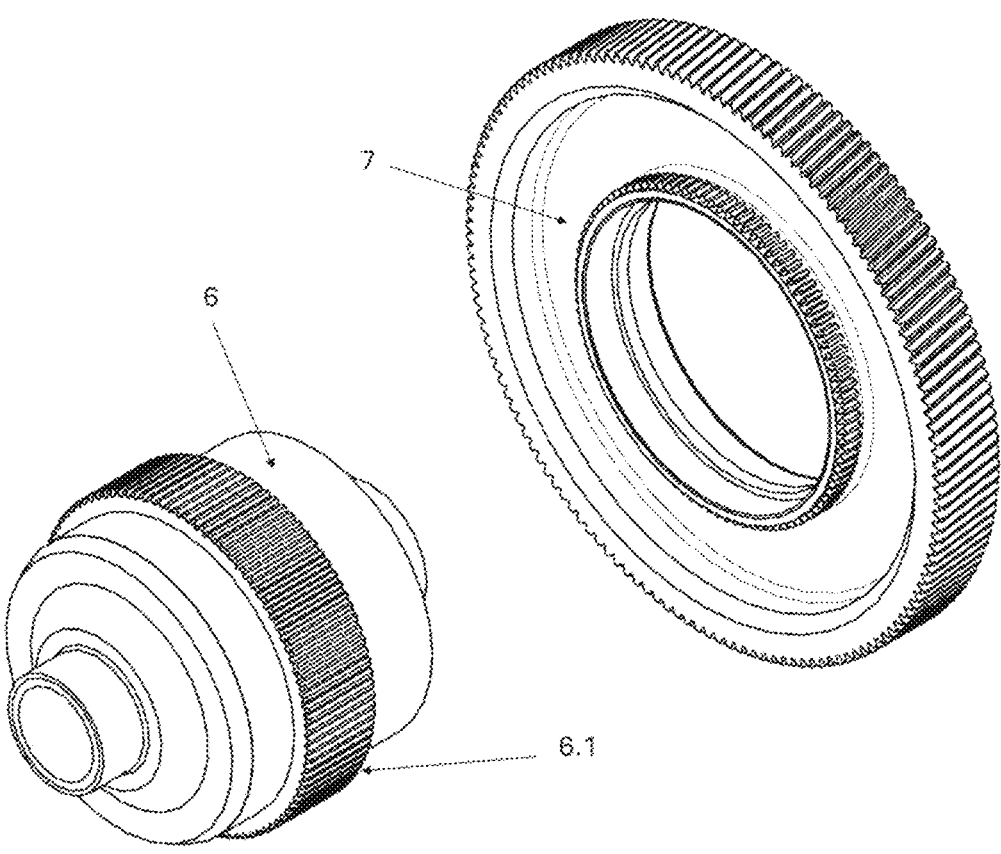
FIG. 13 highlights some components of the exploded view of FIG. 12.
Figure 14:
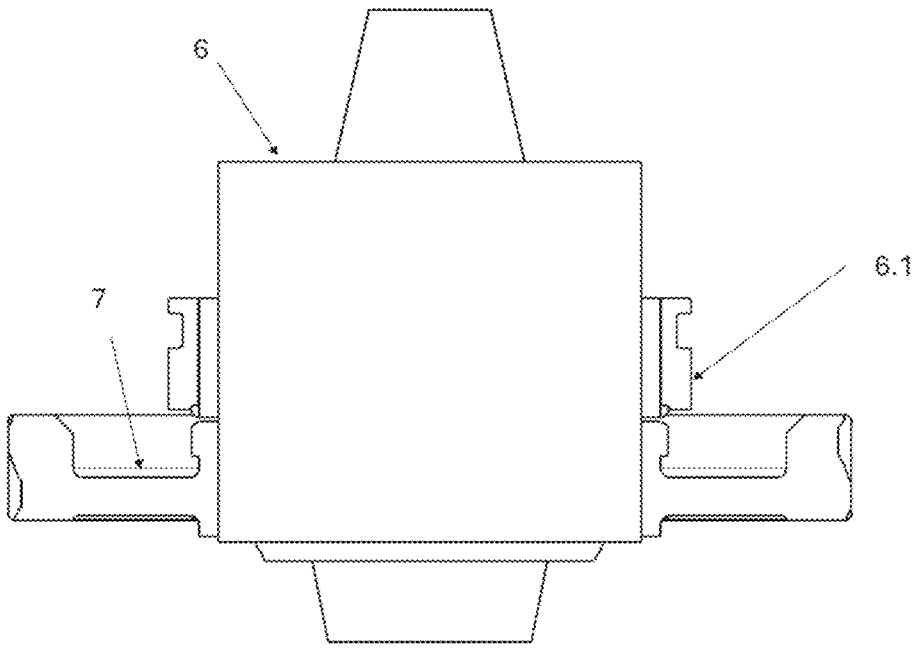
FIG. 14 shows a cross-sectional view of the associated elements shown in FIG. 13.
Figure 15:
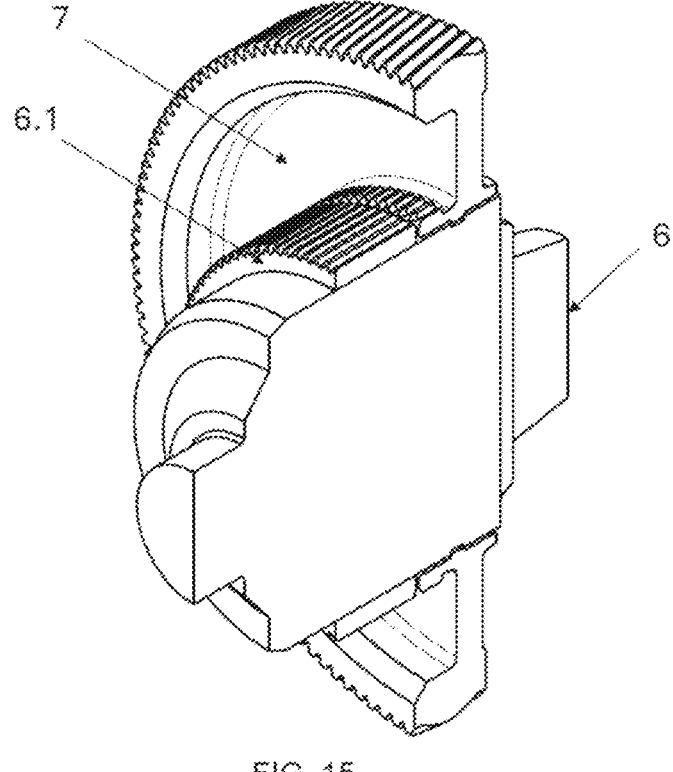
FIG. 15 shows a perspective view of the section shown in FIG. 14.
Figure 16:
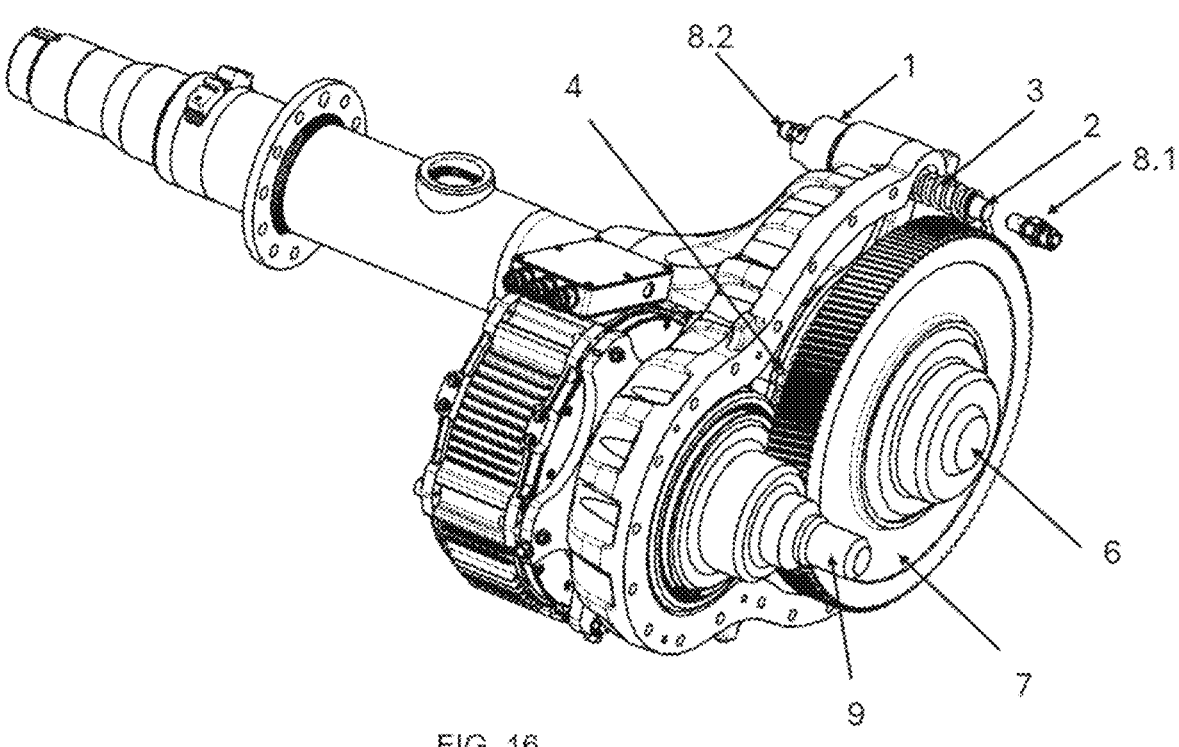
FIG. 16. shows an embodiment of the present invention associated with a shaft half and an electric motor.
Figure 17:
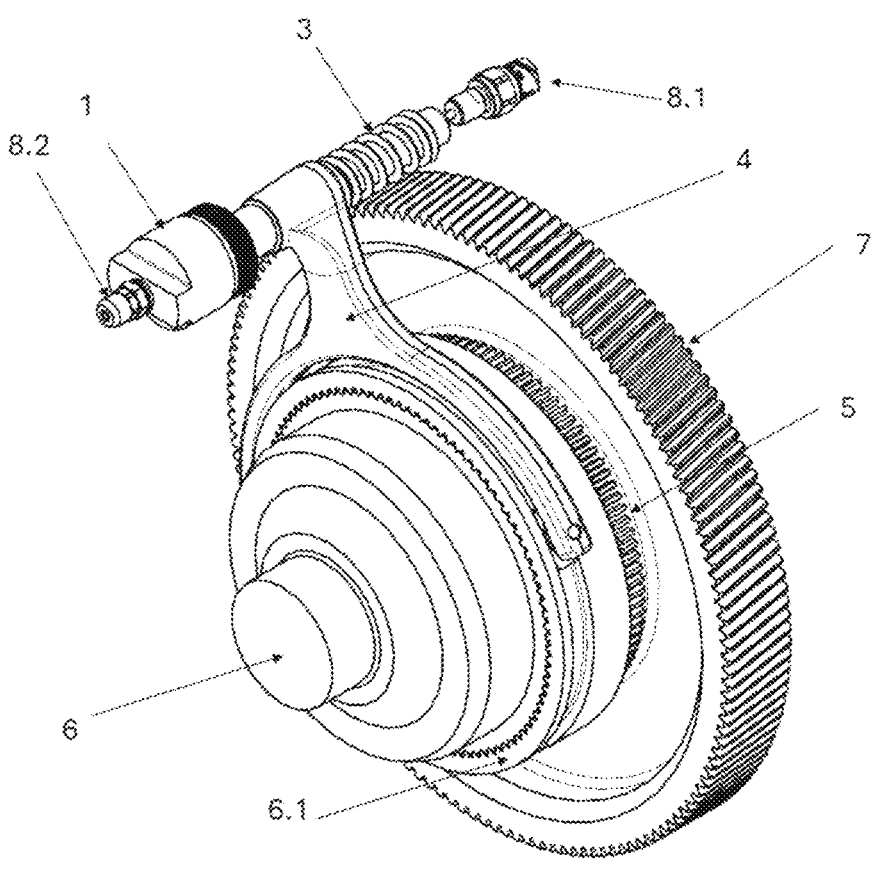
FIG. 17 shows an embodiment of the present invention.
Figure 18:
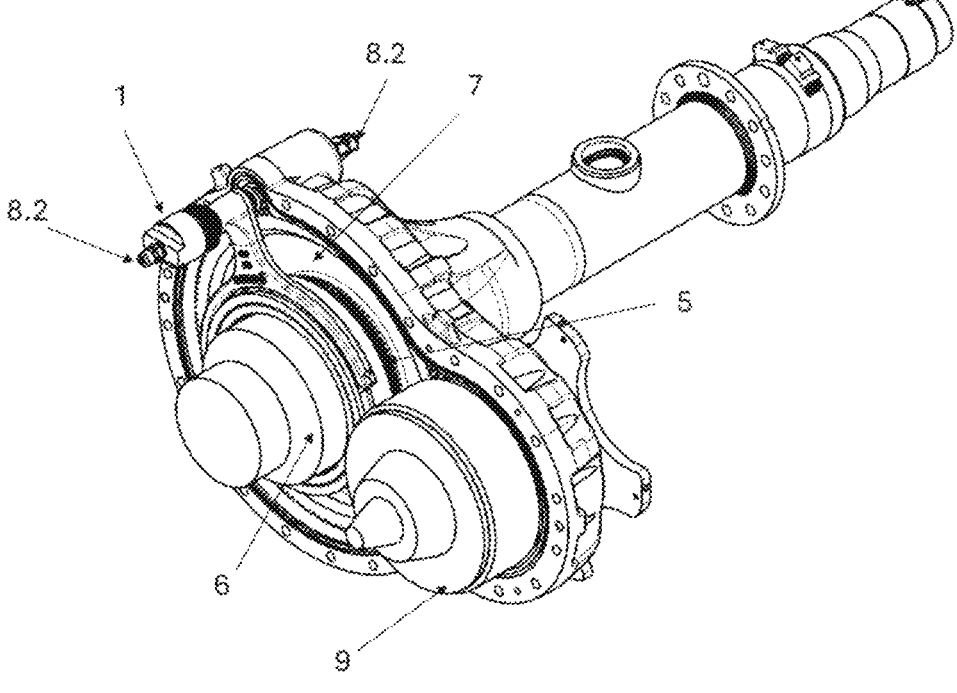
FIG. 18 shows the embodiment shown in FIG. 16, in a perspective view from another angle, not showing the engine.
Figure 19:
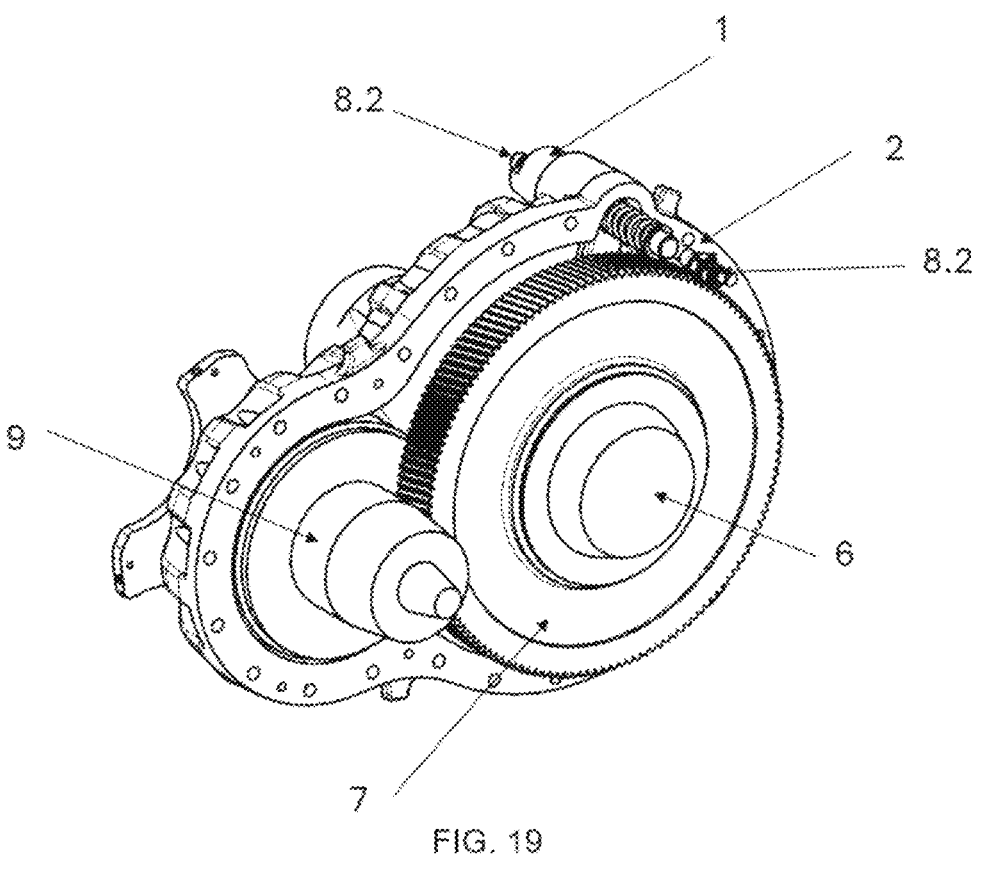
FIG. 19 shows an embodiment of the present invention, where one side of the casing is open.
Figure 20:
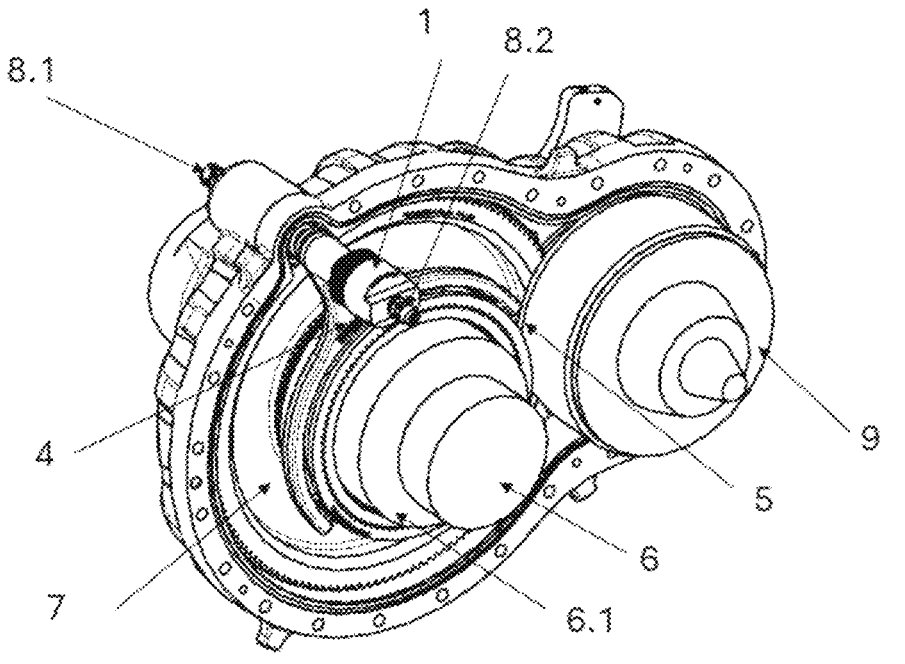
FIG. 20 shows the embodiment shown in FIG. 19, where the other side of the casing is open.
Figure 21:
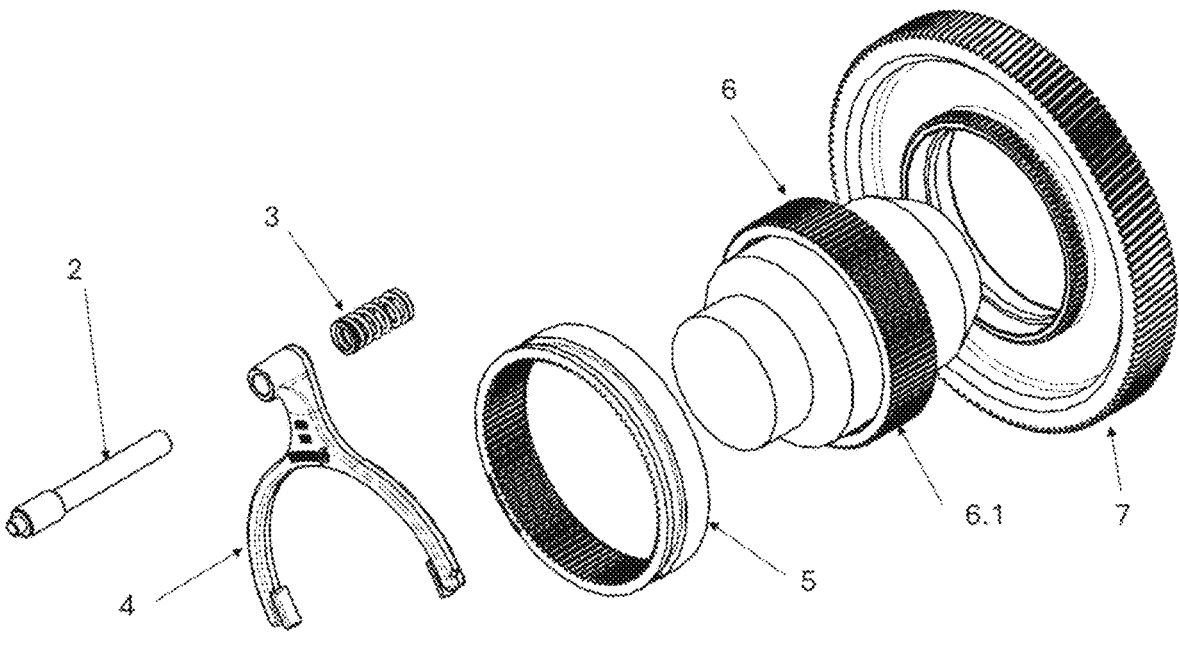
FIG. 21 shows an exploded view of the embodiment shown in FIG. 17.
Figure 22:
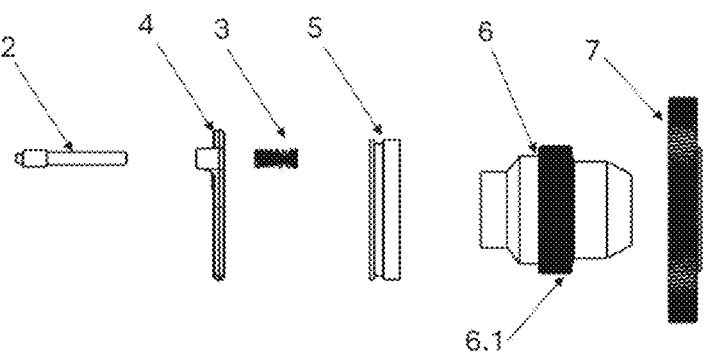
FIG. 22 shows a top view of the exploded view shown in FIG. 21.
Figure 23:
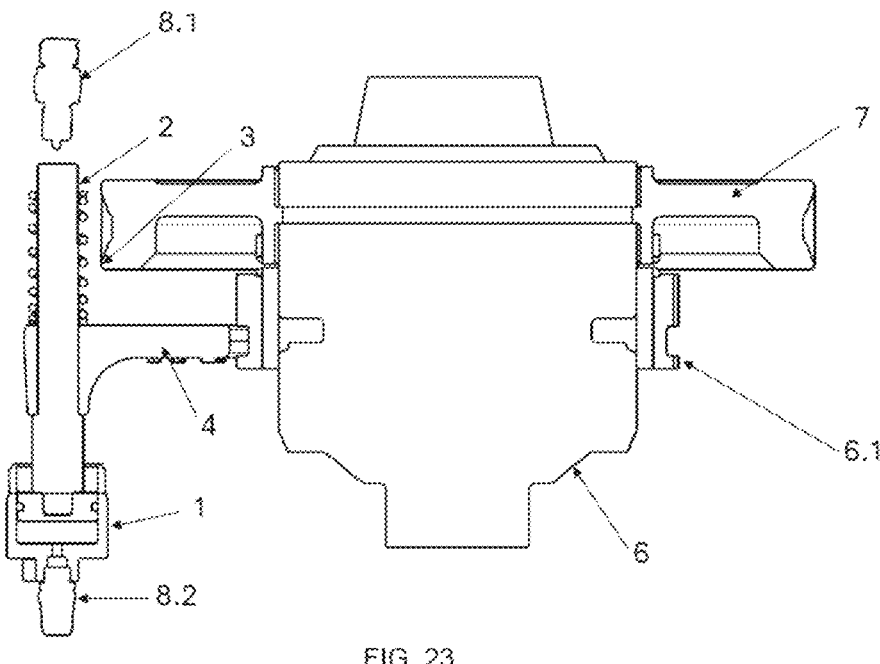
FIG. 23 shows a side cross-section view of the embodiment shown in FIG. 17.
Figure 24:
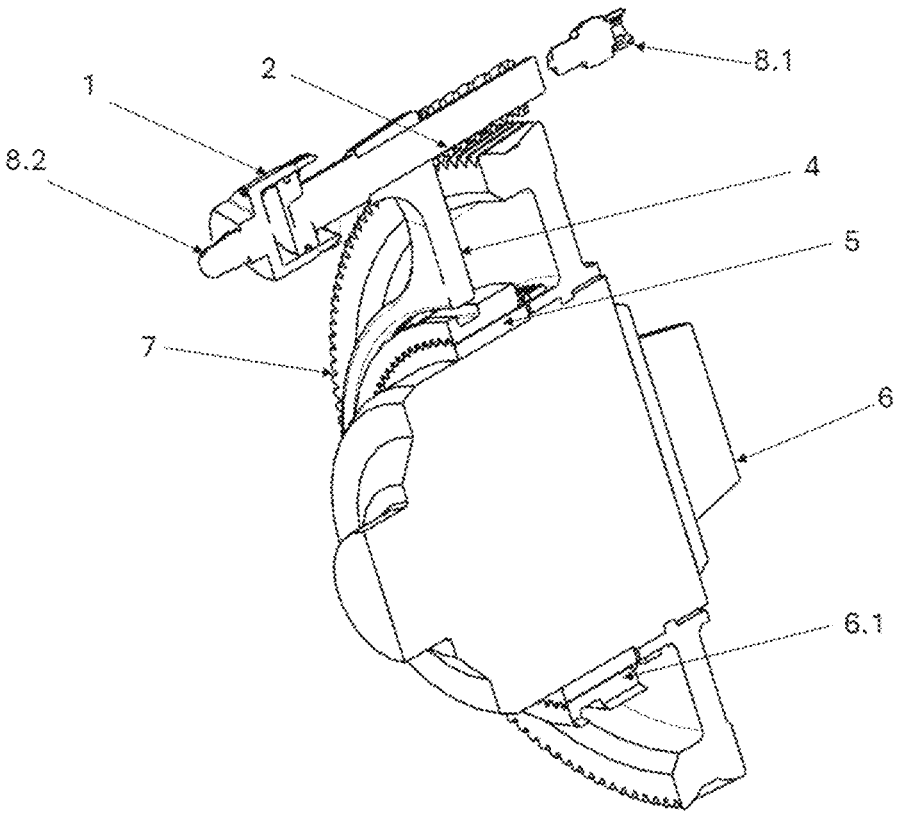
FIG. 24 shows a perspective cross-section view shown in FIG. 23.

FIGS. 8 and 9 show embodiments of the present invention in its casing, which is associated with the shaft of the commercial automotive vehicle, and which also comprises a base for fixing the auxiliary engine.

FIGS. 10 to 24 show embodiments of components of the present invention, where the differential (6) is free to rotate without interference with the gear (7) thanks to the bearings. Also, the differential (6) is equipped with a sprocket wheel (6.1) that can be associated with the sleeve coupling (5), wherein when the sleeve coupling (5) is displaced and coupled to the gear (7), it transmits torque between the gear (7) and the differential (6) and, in this way, transmits torque between the auxiliary motor and the shaft.

FIG. 25 shows a graph with the operating steps of the present invention, where the shaft and motor speeds are shown on a scale of 0 to 100 u.v. (units of speed), while auxiliary engine power is shown on a scale of 0 to 100 p.u. (units of power). As can be seen in the graph of FIG. 25, the coupling period (A) starts when starting the auxiliary engine, so that its speed rises until it reaches the same speed as the shaft, or an equivalent speed, while the displacement shaft (2) is stimulated by the actuator (1), being displaced and moving the fork (4), which initiates the coupling of the sleeve coupling (5) to the gear (7), without the sleeve coupling cover (5) losing the coupling with the differential (6). When the engine and shaft rotation are synchronized and the gear (7) is coupled to the differential (6), also based on the signal sent by the coupling sensor (8.1) and decoupling sensor (8.2), the coupling period (A) ends and the working period (T) begins, where the engine generates its work power, both to provide traction to the shaft and to regenerate energy and charge the batteries.

When there is no longer a need to transfer power/torque/rotation between the engine and shaft, or when the vehicle control system issues a command to decouple the auxiliary engine, the working period (T) ends and the decoupling period (D) begins, where the auxiliary engine power is reduced to relieve the load between the teeth of the gears. When the engine power is zero or close to zero, the actuator (1) stops pushing the displacement shaft (2), which returns to its original position by the action of the return spring (3), bringing with it the sleeve coupling (5), which uncouples the sprocket wheel (6.1) from the differential (6) and the gear (7), ending the disengagement period (D). In this way, the rotation of the gear (7) no longer interacts with the rotation of the differential (6), as they are only connected by bearings.

FIGS. 26 to 31 show prior-art parts and components, which show crown gears (which are coupled to engine reducers) always connected to the shaft differential, that is, at least by a pair of gears always coupled, even without need of torque transmission between them, which interferes with the movement of the vehicle, which would lead to an increase in energy/fuel consumption. The present invention allows the decoupling between the differential (6) and the gear (7) which is coupled to the reducer assembly (9) of the auxiliary engine, allowing to disable the entire gearing system of the engine, the gear (7) being bearing in the differential by means of bearings, allowing free and relative movement between them when the sleeve coupling (5) is decoupled.

Those skilled in the art will appreciate the knowledge presented herein and will be able to reproduce the invention in the presented modalities and in other variants and alternatives, covered by the scope of the following claims.

The invention claimed is:

1. A coupling and/or decoupling device between a shaft of commercial automotive vehicles and at least one auxiliary engine, wherein the auxiliary engine is arranged adjacent to the shaft of the commercial automotive vehicle, said device comprising at least one mechanism that couples and/or decouples the transmission of torque between the at least one auxiliary engine and a free-shaft differential assembly, wherein a control system sends at least one signal for coupling and/or decoupling the transmission of torque between the at least one auxiliary engine and a free shaft differential assembly, wherein the mechanism that couples and/or decouples the torque transmission comprises at least one actuator connected with at least one displacement shaft and at least one motion transmission fork connected to the at least one displacement shaft.

2. The device according to claim 1, wherein the free differential assembly comprises:
   a) a differential provided with at least one sprocket wheel; and
   b) at least one gear connected with independent rotation to the differential by means of at least one set of bearings, wherein the gear is coupled to at least one reducer assembly of the auxiliary engine.

3. The device according to claim 2, wherein the mechanism that couples and/or decouples the torque transmission comprises:
   a) at least one sleeve coupling associated with the motion transmission fork comprising rotational movement with respect to the motion transmission fork; and
   b) the sleeve coupling is coupled to the sprocket wheel of the free differential assembly.

4. The device according to claim 3, wherein the differential can be associated with the gear through the sleeve coupling, transmitting torque and rotation between the differential and the gear to each other.

5. The device according to claim 3, further comprising at least one state identification sensor associable to at least one end of the displacement shaft, said state identification sensor supplies the control system with parameters captured on the position of the displacement shaft.

6. A method of controlling the coupling and/or decoupling between a shaft of commercial automotive vehicles and at least one auxiliary engine arranged adjacent to the shaft, said method comprising a coupling and/or decoupling device between the shaft and the auxiliary engine equipped with a free differential assembly and a control system of the device, said method comprising the steps of:
   a) sending a first signal from the control system to an actuator of the device, activating at least one free differential assembly when the auxiliary motor rotation is synchronized with the shaft rotation, during a coupling period (A) initiated by a command of the drive auxiliary engine vehicle;
   b) displacement of a displacement shaft of the device by the actuator from an initial position, transmitting the movement of said displacement shaft to a sleeve coupling through a motion transmission fork, wherein displacement of the sleeve coupling is in a coaxial movement to a sprocket wheel of the differential of the free differential assembly of the device, engaging the sleeve coupling to a gear which is coupled to the reducer assembly of the auxiliary engine;
   c) sending a second signal from the control system to the device actuator, returning the displacement shaft to the initial position during a decoupling period (D) initiated by a new command of the vehicle to deactivate the auxiliary engine; and
   d) returning the displacement shaft to the initial position, transmitting the movement of said displacement shaft to a sleeve coupling through the motion transmission fork, wherein the displacement of the sleeve coupling in coaxial movement to a sprocket wheel of the differential of the free differential assembly of the device disengages the sleeve coupling from the gear, interrupting interaction between the auxiliary motor and the shaft, ending the decoupling period (D).

7. The method, according to claim 6, further comprising an initial step of receiving at least one position parameter of a displacement shaft of the device by the control system of the device, depending on the receipt of a command from the vehicle, said position parameter sent to the control system by at least one state identification sensor associable to at least one end of the displacement shaft.

8. The method, according to claim 7, further comprising the following steps that end up the coupling period (A) and start the working period (T):

a) the coupling between the gear and the differential given by the sleeve coupling; and b) receiving, by the control system of the device, at least one new position parameter of the displacement shaft sent to the system by the state identification sensor.

9. A commercial automotive vehicle comprising at least one shaft associated with at least one auxiliary engine equipped with a reducer assembly associated with a differential, wherein the differential is a free differential assembly, being associated with the shaft and associated with at least one torque transmission coupling and/or decoupling device between said auxiliary motor and the shaft, wherein the coupling and/or decoupling is in response to at least one signal sent by a control system of the device, wherein the at least one torque transmission coupling and/or decoupling device comprises a mechanism for coupling and/or decoupling the torque transmission comprising an actuator connected with a displacement shaft and a motion transmission fork connected to the displacement shaft, said actuator displacing the motion transmission fork by means of the displacement shaft.

10. An auxiliary shaft for commercial automotive vehicle powered by energy in a regenerative manner, comprising at least one auxiliary engine equipped with a reducer assembly which is associated with the auxiliary shaft through at least one free differential assembly, said differential being associated to at least one torque transmission coupling and/or decoupling device between said auxiliary motor and the shaft, in response to at least one signal sent by a control system of the device, wherein the at least one torque transmission coupling and/or decoupling device comprises a mechanism for coupling and/or decoupling the torque transmission comprising an actuator connected with a displacement shaft and a motion transmission fork connected to the displacement shaft, said actuator displacing the motion transmission fork by means of the displacement shaft.

11. A method of controlling for operating an auxiliary engine in commercial automotive vehicles, wherein the auxiliary engine operates as i) auxiliary traction, ii) regeneration and iii) freewheeling, the method comprising a step of coupling/decoupling the auxiliary engine to at least one shaft of the commercial automotive vehicle, wherein:

a control system capturing vehicle parameters and identifying a demand for i) auxiliary traction, ii) regeneration or iii) freewheeling, and sends a coupling or decoupling signal between the auxiliary engine and the vehicle shaft, wherein the coupling or decoupling is performed by a mechanism for coupling and/or decoupling comprising an actuator connected with a displacement shaft and a motion transmission fork connected to the displacement shaft, said actuator displacing the motion transmission fork by means of the displacement shaft.

\* \* \* \* \*